US011249593B2

(12) United States Patent
Oh et al.

(10) Patent No.: US 11,249,593 B2
(45) Date of Patent: Feb. 15, 2022

(54) PEN INPUT PROCESSING METHOD AND ELECTRONIC DEVICE SUPPORTING SAME

(71) Applicant: Samsung Electronics Co., Ltd., Gyeonggi-do (KR)

(72) Inventors: Hyong Sog Oh, Daegu (KR); Choel Hwi Kwon, Daegu (KR); Hyun Suk Choi, Daegu (KR)

(73) Assignee: Samsung Electronics Co., Ltd.

( * ) Notice: Subject to any disclaimer, the term of this patent is extended or adjusted under 35 U.S.C. 154(b) by 509 days.

(21) Appl. No.: 16/321,727

(22) PCT Filed: Jul. 4, 2017

(86) PCT No.: PCT/KR2017/007091
§ 371 (c)(1),
(2) Date: Jan. 29, 2019

(87) PCT Pub. No.: WO2018/021713
PCT Pub. Date: Feb. 1, 2018

(65) Prior Publication Data
US 2021/0294452 A1  Sep. 23, 2021

(30) Foreign Application Priority Data

Jul. 29, 2016  (KR) .................. 10-2016-0097077

(51) Int. Cl.
*G06F 3/041* (2006.01)
*G06F 3/046* (2006.01)
*G06F 3/0354* (2013.01)

(52) U.S. Cl.
CPC ........ *G06F 3/0418* (2013.01); *G06F 3/03545* (2013.01); *G06F 3/046* (2013.01)

(58) Field of Classification Search
CPC .... G06F 3/0418; G06F 3/03545; G06F 3/046; G06F 3/0354; G06F 3/041
See application file for complete search history.

(56) References Cited

U.S. PATENT DOCUMENTS 9,201,556 B2   12/2015   Free et al.
9,262,028 B2   2/2016    Ahn
(Continued)

FOREIGN PATENT DOCUMENTS

JP     2015079281      4/2015
KR     1020140035726   3/2014
(Continued)

OTHER PUBLICATIONS

PCT/ISA/210 Search Report issued on PCT/KR2017/007091, pp. 5.
PCT/ISA/237 Written Opinion issued on PCT/KR2017/007091, pp. 6.

*Primary Examiner* — Jonathan A Boyd
(74) *Attorney, Agent, or Firm* — The Farrell Law Firm, P.C.

(57) ABSTRACT

One embodiment among embodiments described in the description discloses an electronic device including an electromagnetic induction panel associated with collection of pen data based on a pen input, a memory to store at least one correction table configured to correct pen data made at mutually different positions based on parts of the electromagnetic induction panel, and a processor electrically connected to the electromagnetic induction panel and the memory and configured to correct the pen data through a specified correction table of the at least one correction table based on a connection state or an arrangement state between the electronic device and an accessory including at least a part of a magnet member or a metal member that is able to exert an electrical influence or a magnetic influence on the electromagnetic induction panel. Various embodiments are possible.

13 Claims, 16 Drawing Sheets

(56) References Cited

U.S. PATENT DOCUMENTS

| | | |
|---|---|---|
| 9,569,041 B2 | 2/2017 | Son |
| 9,645,721 B2 | 5/2017 | Horne |
| 2008/0106520 A1 | 5/2008 | Free et al. |
| 2014/0078105 A1 | 3/2014 | Son |
| 2014/0267150 A1* | 9/2014 | Masashi ................. G06F 3/046 345/174 |
| 2014/0354589 A1* | 12/2014 | Ahn ...................... G06F 3/0442 345/174 |
| 2015/0026623 A1 | 1/2015 | Horne |

FOREIGN PATENT DOCUMENTS

| | | |
|---|---|---|
| KR | 1020140142778 | 12/2014 |
| KR | 1020160068054 | 6/2016 |

* cited by examiner

PEN INPUT PROCESSING METHOD AND ELECTRONIC DEVICE SUPPORTING SAME

PRIORITY

This application is a National Phase Entry of PCT International Application No. PCT/KR2017/007091 which was filed on Jul. 4, 2017, and claims priority to Korean Patent Application No. 10-2016-0097077, which was filed on Jul. 29, 2016, the content of each of which is incorporated herein by reference.

TECHNICAL FIELD

Various embodiments relate to pen input processing.

BACKGROUND ART

Recently, electronic devices have supported a pen input function to perform a write operation by using a pen on a display.

DISCLOSURE

Technical Problem

In the case of an electromagnetic induction scheme among conventional pen input schemes of electronic devices, misrecognition may be caused by not only peripheral hardware components, but various accessories (e.g., book covers) coupled to the electronic devices.

Various embodiments are to provide a method for processing a pen input, capable of removing a pen input error by applying various correction tables depending on states of an electronic device, and an electronic device supporting the same.

Technical Solution

According to various embodiments of the present invention, an electronic device may include an electromagnetic induction panel associated with collection of pen data based on a pen input, a memory to store at least one correction table configured to correct pen data made at mutually different positions based on parts of the electromagnetic induction panel, and a processor configured to correct the pen data through a specified correction table of the at least one correction table based on a connection state or an arrangement state between the electronic device and an accessory including at least a part of a magnet member or a metal member that is able to exert an electrical influence or a magnetic influence on the electromagnetic induction panel.

According to various embodiments, an electronic device may include a housing, an electromagnetic induction panel provided inside the housing and associated with collection of pen data based on a pen input, a memory to store at least one correction table configured to correct pen data made at mutually different positions based on parts of the electromagnetic induction panel, a hall sensor provided at one side of the housing and creating hall sensing information generated from approach of a cover including at least a portion of a magnet member or a metal member that is able to exert a magnetic influence on the electromagnetic induction panel, and a processor configured to select a specified correction table of the at least one correction table based on the hall sensing information received from the hall sensor such that the specified correction table is applied to correct the pen data.

According to various embodiments, a method for processing a pen input may include receiving a pen input, determining whether hall sensing information is received from at least one hall sensor, selecting any one correction table of at least one correction table configured to correct pen data at mutually different positions based on parts of an electromagnetic induction panel corresponding to that the hall sensing information is received, and correcting pen data, which corresponds to the received pen input, based on the selected correction table.

Advantageous Effects

As described above, according to various embodiments, the pen input error may be removed depending on the state of the electronic device or the type of a connected accessory, thereby exactly performing a pen input function.

MODE FOR INVENTION

Figure 1:
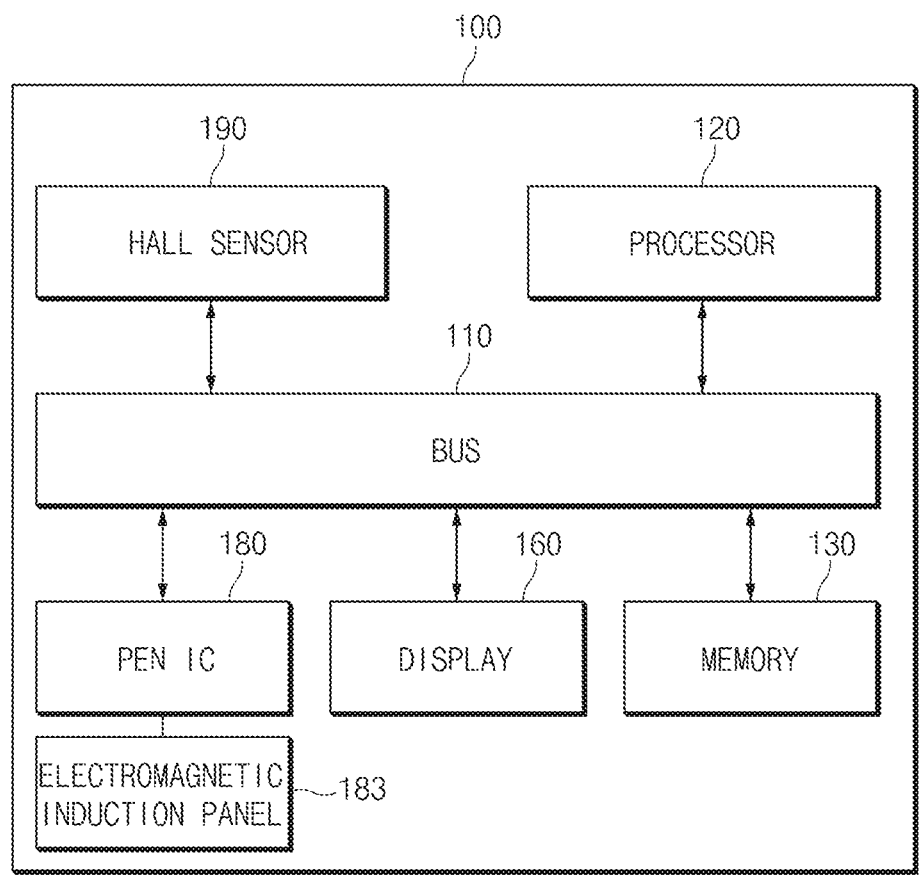
FIG. 1 is a view illustrating one example of an electronic device, according to an embodiment of the present disclosure.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority, terms may be used to distinguish the relevant components from other components, and may not limit the corresponding components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. The terms used herein, which include technical or scientific terms, may have the same meaning that is generally understood by a person skilled in the art. It will be further understood that terms, which are defined in a commonly used dictionary, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, iris cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or Play Station™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System Receiver (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

FIG. 1 is a view illustrating one example of an electronic device, according to an embodiment of the present disclosure.

Referring to FIG. 1, according to the present disclosure, an electronic device 100 may include a processor 120, a memory 130, a display 160, a pen integrated circuit (IC) 180 (or a pen processor), and a hall sensor 190, which are provided in a housing, and may include a bus 110 electrically connecting components with each other. Additionally or alternatively, the electronic device 100 may further include a communication interface that is able to communicate with an external electronic device and an arrangement state detecting sensor (e.g., an acceleration sensor, a geomagnetic sensor, or the like) to detect the movement of the electronic device 100.

The housing may be open in at least a portion of a first surface facing, for example, in a first direction. At least a portion of an area, on which the screen of the display 160 is displayed, may be exposed through the first surface that is open. The housing may include a second surface facing in a second direction (e.g., a direction opposite to the first direction) and may include at least one sidewall to surround side portions of the first surface and the second surface. According to various embodiments, the housing may include a mounting groove in which the electronic pen may be inserted and fixed. The mounting groove may include a switch to detect the insertion or the separation of the electronic pen. The processor 120, the memory 130, and the pen IC 180, which are described above, may be mounted on the printed circuit board and the printed circuit board may be provided inside the housing.

The bus 110 may connect the processor 120 with at least one of the memory 130, the display 160, the pen IC 180, and the hall sensor 190. For example, the bus 110 may transmit sensing information sensed by the hall sensor 190 to the processor 120, and may transmit an instruction of the processor 120 to the pen IC 180.

The processor 120 may perform signal transmission and signal processing associated with the operation of the electronic device 100. The processor 120 may include, for example, an application processor (AP) associated with the execution of an application of the electronic device 100 and the operation of the electronic device 100. In addition, the processor 120 may determine the connection state with or the mounting state on an accessory (e.g., a cover) based on hall sensing information obtained by the hall sensor 190. The processor 120 may control the pen IC 180 to apply a specified correction table corresponding to the connection state with the accessory or the mounting state on the accessory.

According to various embodiments, the processor 120 may determine the type of the accessory connected with the electronic device 100 based on hall sensing information or connector connection information. The processor 120 may be configured to process a pen input by applying a specified correction table based on the determined type of the accessory.

In addition, the processor 120 may determine the mounting state of the electronic device 100. For example, the processor 120 may output mounting angle information through the display 160 in the state that the accessory is connected. The processor 120 may output guide information (e.g., selection for determining a current mounting state) for determining a mounting angle and may obtain the mounting angle information based on user determination (or a user input). According to various embodiments, the processor 120 may determine the mounting angle of the electronic device 100 by using mounting state detection information (e.g., at least one of acceleration information and geomagnetic information). The processor 120 may perform a control operation to apply a specified correction table based on the type of the accessory and the determined mounting angle. In the above operation, the processor 120 may activate the pen IC 180 when a specified event occurs (e.g., when the electronic pen is separated from a specified mounting groove, when a specified application associated with the electronic pen is executed, or when a user input is made to instruct the operation of the electronic pen). The processor 120 may determine cover connection, a cover type, or the mounting angle by activating the hall sensor 190 in response to the activation of the pen IC 180. In addition, the processor 120 may activate the hall sensor 190 when the pen input is received and may select a correction table (e.g., a basic correction table or a sub-correction table) depending on whether hall sensing information is collected.

The memory 130 may store data associated with the operation of the electronic device 100. For example, the memory 130 may store a plurality of correction tables associated with processing the pen input. The memory 130 may store at least one instruction set associated with processing the pen input by the electronic device 100. For example, the memory 130 may store an instruction set for determining whether a pen is detached, an instruction set for processing pen input reception, an instruction set for determining the connection state between the electronic device 100 and the accessory based on sensing information transmitted by the hall sensor 190. In addition, the memory 130 may include an instruction set for applying the specified correction table to the pen input depending on the state of the electronic device 100, or an instruction set to process a function depending on the pen input.

The display 160 may include a display panel to output at least one screen associated with the operation of the electronic device 100. Additionally or alternatively, the display 160 may further include a touch panel. The processor 120 may activate at least one of an electromagnetic induction panel 183 or a touch panel depending on whether the pen input is made. According to an embodiment, the display 160 may output a specified indicator depending on whether the approaching of the electronic pen is recognized. The indicator may be displayed on the display 160 when the electronic pen approaches within a specified distance or may be removed (the display of the indicator is disappeared) from the display 160 when the electronic pen is touched to the display 160 or away from the display 160 beyond the specified distance. The display 160 may output guide information on whether the accessory is connected or information on whether a correction table is changed.

The pen IC 180 may control a pen penal included in the display 160. For example, the pen IC 180 may output and receive a signal for performing a scanning operation in a specified electromagnetic induction scheme through the pen panel. When the pen input occurs, the pen IC 180 may perform pen input correction by applying a specified correction table. For example, the pen IC 180 may perform the pen input correction depending on a correction table specified by the processor 120. In this connection, the pen IC 180 may transmit, to the processor 120, the pen input occurring, when the pen input occurs, and may receive, from the processor 120, information on the type of a correction table to be applied. The pen IC 180 may perform relevant pen input correction by using the received correction table and may transmit, to the processor 120, the corrected pen input.

According to various embodiments, the pen IC 180 may manage the switch to determine whether the electronic pen is inserted or detached (determine a turn-on state or a turn-off state of the switch). When the electronic pen is detached from the mounting groove, the pen IC 180 may transmit information about whether the electronic pen is detached from the mounting groove to the processor 120. The processor 120 may determine at least one of an accessory connection state, the type of the accessory in connection, or the mounting state of the electronic device 100, corresponding to the detaching of the electronic pen. The processor 120 may determine a correction table to be applied based on at least one of the accessory connection state, the type of the accessory in connection, or the mounting state of the electronic device 100, and may transmit, to the pen IC 180, the value of the determined correction table or an address value of the memory 130 in which the correction table is stored. According to various embodiments, the pen IC 180 may be integrated with the processor 120. In this case, the pen IC 180 may operate as a component of the processor 120.

The electromagnetic induction panel 183 may include a panel provided to output a current signal having a specified waveform under the control of the pen IC 180. The current flowing through the electromagnetic induction panel 183 may be distorted by an external condition (e.g., external magnetic force). The electromagnetic induction panel 183 may generate an induction current from a coil included in the pen, for example, when a pen or the like approaches, and may transmit generated induction current to the pen IC 180.

At least one hall sensor 190 may be provided at one side of the housing of the electronic device 100, may sense magnetic force of a magnet, which approaches, and may create sensing information. The hall sensor 190 may transmit the sensed sensing information to the processor 120. According to an embodiment, hall sensors 190 may be arranged in a plurality of areas of the housing of the electronic device 100. The hall sensors may have respective identification information (e.g., ID information) and may provide the respective ID information to the processor 120 in the procedure of transmitting sensing information associated with the approaching of magnetic force). Accordingly, the processor 120 may determine a position connected with an accessory having a magnet, based on the ID information of the hall sensor 190.

According to various embodiments, the electronic device 100 may include a connector for connecting the accessory (e.g., the cover or the keyboard). The processor 120 may determine the type of the accessory, which is connected, based on the connector. When the design is made to determine the type of the accessory based on the connector, the hall sensor 190 may be removed from the components of the electronic device 100.

As described above, the electronic device 100 may determine the type of the connected accessory, and the mounting state of the electronic device 100 by using the hall sensor 190, and may perform pen input processing by using the correction table matched with the relevant situation based on the type of the connected accessory, and the mounting state of the electronic device 100.

Figure 2:
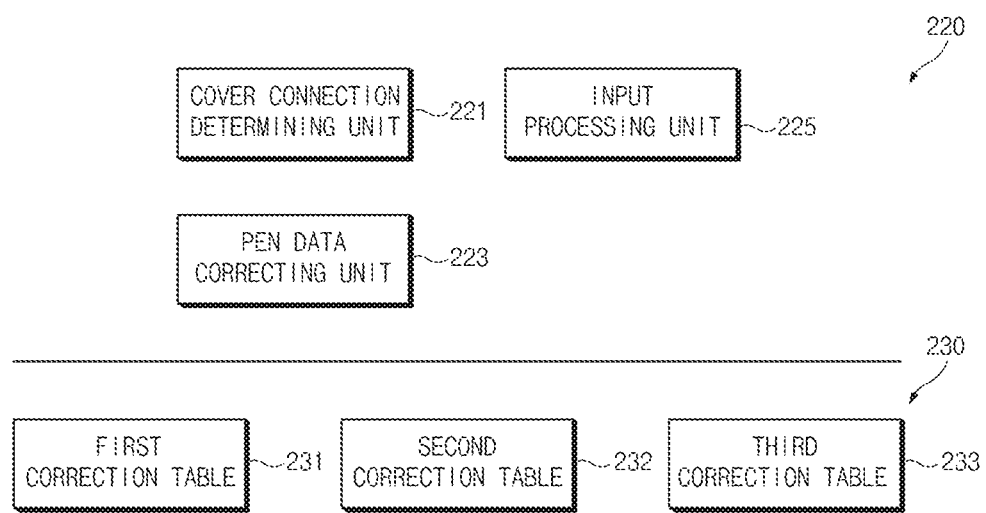
FIG. 2 is a view illustrating a processor, according to an embodiment of the present invention.

FIG. 2 is a view illustrating a processor and a memory, according to an embodiment of the present invention.

Referring to FIG. 2, according to the present invention, at least a portion of a memory 230 (e.g., the memory 130) may store a basic correction table (e.g., a first correction table 231), or a sub-correction table (e.g., a second correction table 232 and a third correction table 233). Regarding the number of correction tables, a large number of correction tables or a small number of correction tables may be provided depending on correction functions, based on cover identification, which is supported by the electronic device 100. The basic correction table may include a correction table corresponding to the state that the electronic device 100 is operated without an additional accessory connected with the electronic device 100. Alternatively, the basic correction table may include a correction table used for the mounting state that does not exert any influence on the sensing operation of the electromagnetic induction panel 183 by a specific magnet arranged in the electronic device 100, even if the electronic device 100 is connected with the cover. The sub-correction table may include a correction table used to correct sensing information errors (e.g., a sensing current errors) of the electromagnetic induction panel 183 in the electronic device 100, depending on the connections of covers including magnets or metal materials arranged at mutually different positions. Alternatively, the sub-correction table may include a correction table used to correct the sensing current error of the electromagnetic induction panel 183 in the electronic device 100 depending on mutually different mounting states.

As described above, the memory 230 may store the basic correction table, which is used when the sensing error is not caused by the accessory, and the sub-correction table used when the sensing error is caused by the accessory. The sensing error may include, for example, the difference between the value of a current, which is induced by the electromagnetic induction panel as an accessory including the magnet member or the metal member is positioned around the electromagnetic induction panel, and the value of the current induced in the state that the accessory is not positioned around the electromagnetic induction panel. The processor 220 (e.g., the processor 120 or the pen IC) may correct a relevant voltage value depending on the position state of the accessory by using a set correction table, when detecting the voltage value from a sensing current error. The above-described basic correction table may include correction values of magnetic flux errors (e.g., the change of the unintended sensing current) in the electromagnetic induction panel, which are caused by at least one magnet or metal material provided inside the electronic device 100. The sub-correction table may include magnetic flux error correction values calculated experimentally or statistically depending on the positions between the electronic device 100 and the magnet or the metal material of the accessory.

According to the present invention, the processor 220 (e.g., the processor 120) may include a cover connection determining unit 221, a pen data correcting unit 223, or an input processing unit 225. At least some of the cover connection determining unit 221, the pen data correcting unit 223, and the input processing unit 225 may be implemented in hardware or software. According to an embodiment, the cover connection determining unit 221, the pen data correcting unit 223, and the input processing unit 225 may be implemented by hardware processors, respectively or one processor.

The cover connection determining unit 221 may determine whether an accessory (e.g., a book cover) is connected with the electronic device 100. In this connection, the cover connection determining unit 221 may receive hall sensing information from at least one hall sensor 190. The hall sensor 190 may be placed at a specified position in one side of the housing of the electronic device 100, as described above. Accordingly, when the accessory, such as a cover having a magnet arranged at a specific position, is connected, the cover connection determining unit 221 may determine the connection state and the type of the cover, corresponding to whether the hall sensing information is detected and to the position of the hall sensor 190 that has detected the hall sensing information.

According to various embodiments, the cover connection determining unit 221 may collect information on cover connection and information on an arrangement state between the cover and the electronic device 100, in response to receiving the hall sensing information. For example, when the hall sensing information is received from the hall sensor 190, which is placed at a specific position, of a plurality of hall sensors, the cover connection determining unit 221 may determine that a specified cover is connected and that the electronic device 100 is in a specified mounting state. In this connection, the cover connection determining unit 221 may store and manage a mapping table having an arrangement state between the electronic device 100 and the cover, which is determined for each position of the hall sensor 190.

The pen data correcting unit 223 may receive connection information (e.g., the ID of the hall sensor 190 and the hall sensing information) associated with the hall sensor information from the cover connection determining unit 221. When the electronic device 100 includes one hall sensor 190, the pen data correcting unit 223 may receive, from the cover connection determining unit 221, connection information representing only whether the hall sensing information is generated. The pen data correcting unit 223 may select a specified correction table based on the received connection information. For example, the pen data correcting unit 223 may select the basic correction table (or the first correction table 231), which is to be applied when the hall sensing information is not received, or the sub-correction table (the second correction table 232 or the third correction table 233) to be applied when the hall sensing information is received. According to an embodiment, the pen data correcting unit 223 may select the second correction table 232 when a first type of a cover is connected, and may select the third correction table 233 when a second type of a cover is connected. The pen data correcting unit 223 may select the first correction table 231 when the specified cover is in a first mounting state with the electronic device 100, and may select the second correction table 232 when the specified cover is in a second mounting state with the electronic device 100.

The input processing unit 225 may receive a specified correction table from the pen data correcting unit 223 and may obtain the value of a position actually indicated through a pen input by applying the relevant correction table to the received pen input. For example, the input processing unit 225 may output a specified image corresponding to the position indicated through the pen input or may execute an icon or content arranged in an area where the pen input is positioned. Alternatively, the input processing unit 225 may obtain a hovering event through the pen input and may process a function based on the obtained hovering event. For example, the input processing unit 225 may output, to the display 160, an indicator representing a point that hovering occurs or may perform an item indicated through the pen input by hovering.

Meanwhile, although the above-description has been made in that the electronic device 100 determines, by using the hall sensor 190, at least one of the cover connection state, the type of the cover, and the mounting state of the electronic device 100 by the cover, the present invention is not limited thereto. For example, the accessory (e.g., the cover) may be connected with the electronic device 100 through a connector. The cover connection determining unit 221 may determine the type of a book cover (e.g., mutually different resistors are placed depending on cover types) connected through the connector. In this case, the pen data correcting unit 223 may select a correction table based on the type of a book cover recognized through the connector.

According to various embodiments, an electronic device according to an embodiment may include an electromagnetic induction panel associated with collection of pen data from a pen input, a memory to store at least one correction table configured to correct pen data at mutually different positions based on parts of the electromagnetic induction panel, and a processor connected to the electromagnetic induction panel and the memory and configured to correct the pen data through a specified correction table of the at least one correction table based on a connection state or an arrangement state between the electronic device and an accessory including at least a portion of a magnet member or a metal member that is able to exert an electrical influence or a magnetic influence on the electromagnetic induction panel.

According to various embodiments, the electronic device may further include at least one hall sensor to collect sensing information for determining the connection state or the arrangement state with the accessory.

According to various embodiments, the processor may be configured to determine a type of the accessory based on identification information of the hall sensor; and use a correction table corresponding to the type of the accessory for correction of the pen data.

According to various embodiments, the processor may be configured to determine a connection state between the accessory and the electronic device based on identification information of the hall sensor; and select a correction table corresponding to the arrangement state and use the correction table for correction of the pen data.

According to various embodiments, the electronic device may further include an arrangement state detection sensor to collect sensing information associated with movement or arrangement state determination of the electronic device.

According to various embodiments, the processor may be configured to determine the arrangement state of the electronic device based on sensing information transmitted from the arrangement state detection sensor in the connection state of the accessory, and select a correction table corresponding to the arrangement state of the electronic device and use the correction table for correction of the pen data.

According to various embodiments, the electronic device may further include a pen processor to process transmission and reception of a signal of the electromagnetic induction panel.

According to various embodiments, the processor may be configured to process the correction of the pen data by transmitting the selected correction table to the pen processor.

According to various embodiments, the electronic device may further include a connector allowing connection with the accessory, and the processor may be configured to determine a type of an accessory connected through the connector through a physical device disposed in the connector and select a specified correction table based on the type of the accessory to correct the pen data.

According to various embodiments, an electronic device according to an embodiment may include a housing, an electromagnetic induction panel disposed inside the housing and associated with collection of pen data from a pen input, a memory to store at least one correction table configured to correct pen data at mutually different positions based on parts of the electromagnetic induction panel, a hall sensor provided at one side of the housing and creating hall sensing information generated from the approaching of a cover including at least a portion of a magnet member or a metal member that is able to exert an electrical influence or a magnetic influence on the electromagnetic induction panel, and a processor configured to select a specified correction table of at least one correction table based on the hall sensing information received from the hall sensor such that the specified correction table is applied to correct the pen data.

According to various embodiments, the processor may be configured to determine a type of the cover based on the hall sensing information, and select a specified correction table based on the type of the cover such that the specified correction table is applied to correct the pen data.

According to various embodiments, the processor may be configured to determine the mounting state of the cover on the electronic device based on the hall sensing information and select a specified correction table based on the mounting state such that the specified correction table is applied to the correction of the pen data.

According to various embodiments, the electronic device may further include a display to output information associated with whether the cover is connected or whether the correction table is changed.

Figure 3:
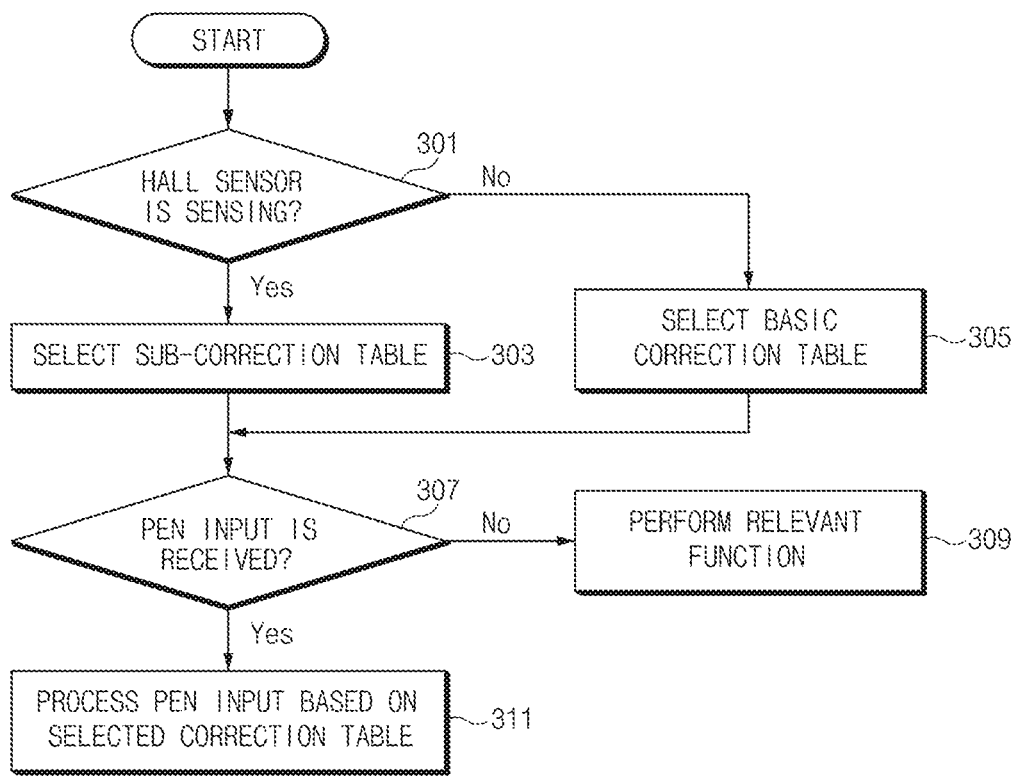
FIG. 3 is a view illustrating a method for processing a pen input, according to an embodiment of the present invention.

FIG. 3 is a view illustrating a method for processing a pen input, according to an embodiment of the present invention.

Referring to FIG. 3, according to the present invention, regarding a method for processing a pen input, in operation 301, the processor 220 (e.g., the cover connection determining unit 221 or the processor 120) may determine whether the sensing operation of the hall sensor 190 is performed. Alternatively, the processor 220 may determine whether the sensing information is received from the hall sensor 190. In this operation, the processor 220 may be configured to activate the pen IC 180 and the hall sensor 190 and to perform the hall sensing operation depending on cover connection. According to various embodiments, the pen IC may be activated in response to the request for the execution of an application to be performed based on an electronic pen is requested or in response to the recognition of (e.g., switching operation recognition due to the detaching of the electronic pen) an operation that the electronic pen is detached from a specified position (e.g., a groove that the electronic pen is mounted). When the pen IC 180 is activated, the processor 220 may activate the hall sensor 180 to determine whether to perform a hall sensing operation.

When the sensing information of the hall sensor 190 is received, the processor 220 (e.g., the cover connection determining unit 221) may select the sub-correction table based on the received sensing information in operation 303. For example, the processor 220 may perform a control operation to transmit, to the pen IC 180, the sub-correction table stored in the memory 130 or to select a sub-correction table embedded in the pen IC 180. The sub-correction table may include a table to correct a sensing value of the electromagnetic induction panel 183 of the electronic device 100 by at least a portion of the magnet or the metal material disposed in the specified accessory (e.g., the cover).

When the sensing information of the hall sensor 190 is not received, the processor 220 (e.g., the cover connection determining unit 221) may select a basic correction table in operation 305. For example, the processor 220 may perform a control operation to transmit, to the pen IC 180, the basic correction table stored in the memory 130 or to select a basic correction table embedded in the pen IC 180.

In operation 307, the processor 220 (e.g., the pen data correcting unit 223) may determine whether the pen input is received. When another input is received instead of the pen input, the processor 220 may perform a function based on a relevant input in operation 309. For example, the processor 120 may determine the type of a received event and may perform a function such as a communication function, a file reproducing function, a file editing function, or the like depending on the type of the event. The basic correction table may include, for example, a table obtained by correcting sensing errors of the electromagnetic induction panel 183, which are caused by at least a portion of the magnet or the metal material disposed in the electronic device 100.

When the pen input is received, in operation 311, the processor 220 (e.g., the pen data correcting unit 223 and the input processing unit 225) may process the corrected pen input, after performing the correction based on the correction table selected in the previous operation. For example, when the sub-correction table (e.g., the second correction table 232 or the third correction table 233 is selected corresponding to that the sensing information of the hall sensor 190 is received, the processor 220 may process the pen input by applying the relevant correction table to the received pen input. Alternatively, when the basic correction table is selected as the hall sensing information is not received in the previous operation, the processor 220 (e.g., the pen data correcting unit 223) may correct the pen input (or the pen data) by applying the basic correction table (e.g., the first correction table 231).

Figure 4:
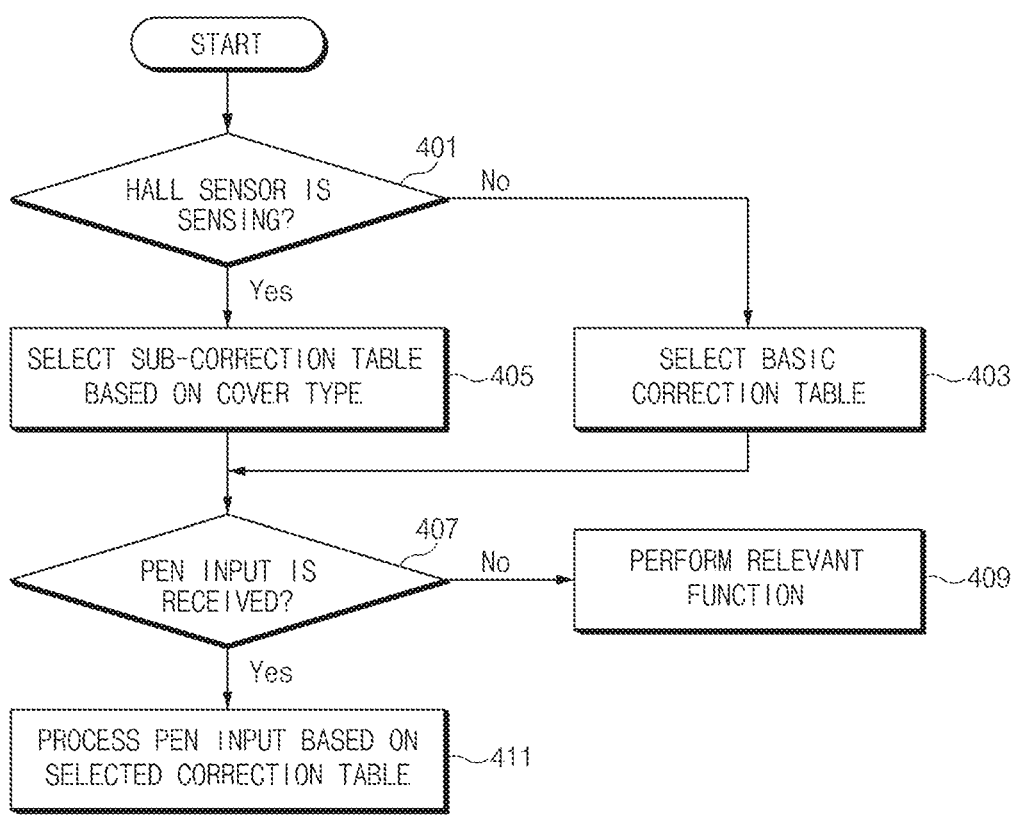
FIG. 4 is a view illustrating another method for processing a pen input, according to an embodiment of the present invention.

FIG. 4 is a view illustrating another method for processing a pen input, according to an embodiment of the present invention.

Referring to FIG. 4, regarding the method for processing the pen input, according to the present invention, operation 401, operation 403, operation 407, and operation 409 may include operations the same as or similar to operation 301, operation 303, operation 307, and operation 309 described made with reference to FIG. 3, respectively.

In operation 405, the processor 220 (e.g., the cover connection determining unit 221) may determine a cover type. For example, the electronic device 100 may include a plurality of hall sensors 190 at mutually different positions. Accordingly, the processor 220 may determine the position that the hall sensor 190 is disposed, based on a hall sensor ID of the received hall sensing information. The electronic device 100 may store and manage a first mapping table having cover types defined depending on the positions of the hall sensor. The processor 220 may determine the cover type corresponding to the relevant hall sensor ID based on the first mapping table previously stored in the memory 230.

The processor 220 may select another sub-correction table with respect to the determined cover type.

In operation 407, the processor 220 (e.g., the pen data correcting unit 223 and the input processing unit 225) may determine whether the pen input is received. When another input is received instead of the pen input, the processor 220 may perform a function based on that the specified event occurs, in operation 409.

When the pen input is received, in operation 411, the processor 220 (e.g., the pen data correcting unit 223 and the input processing unit 225) may process the pen input processing based on the correction table selected in the previous operation (e.g., operation 403 or operation 405). For example, when the type of a cover, which is connected, is determined, the processor 220 may process the pen input by applying a correction table based on the cover type. The electronic device 100 may store and manage a second mapping table obtained by mapping correction tables to cover types, respectively. The processor 220 may select the correction table corresponding to the determined cover type, based on the second mapping table. The processor 220 may correct the sensing error of the electromagnetic induction panel, based on the selected correction table. According to another embodiment, the processor 220 may process the received pen input, based on the basic correction table selected as the connected cover is absent.

Figure 5:
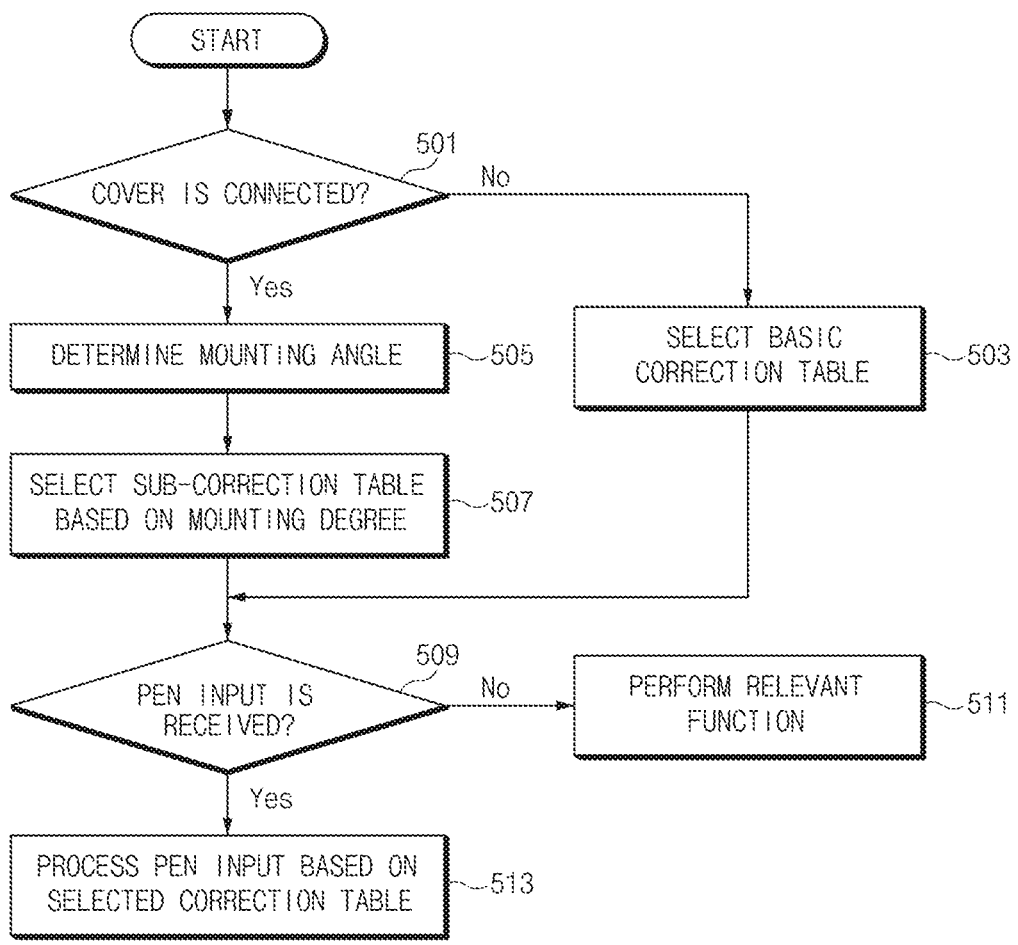
FIG. 5 is a view illustrating another method for processing a pen input, according to an embodiment of the present invention.

FIG. 5 is a view illustrating still another method for processing a pen input, according to an embodiment of the present invention.

Referring to FIG. 5, regarding the method for processing the pen input according to the present invention, in operation 501, the processor 220 (e.g., the cover connection determining unit 221) may determine whether a cover is connected. Regarding the determining of whether the cover is connected, the processor 120 may use the hall sensor 190 as described above. Alternatively, the processor 220 may determine whether there is cover connection through a connector. When the cover is not connected, in operation 503, the processor 220 may select a basic correction table (e.g., the correction table is provided to correct errors by components included in the electronic device 100 without the cover connection).

When the cover is connected, in operation 505, the processor 220 (e.g., the cover connection determining unit 221) may determine a mounting angle of the electronic device 100. In addition, the processor 220 may determine the mounting angle of the electronic device 100 with respect to the cover. According to an embodiment, the processor 220 may determine the form that the electronic device 100 is mounted on the cover, based on a hall sensor ID received from the hall sensor 190. In this connection, the electronic device 100 may store and manage a third mapping table having mounting angles of the electronic device 100 defined depending on hall sensor IDs. The processor 220 may determine the mounting angle of the electronic device 100 with respect to the cover, based on the third mapping table. According to various embodiments, the processor 220 may determine the mounting state of the electronic device 100 corresponding to the change in the movement of the electronic device 100 after the electronic device 100 is connected with the cover. For example, the processor 220 may determine the present mounting state of the electronic device 100 based on an acceleration sensor or a geomagnetic sensor included in the electronic device 100.

In operation 507, the processor 220 (e.g., the pen data correcting unit 223 and the input processing unit 225) may select a sub-correction table based on the mounting angle. For example, the processor 220 may select a second correction table 232 when the electronic device 100 is mounted at a first mounting angle on the cover. Alternatively, the processor 220 may select a third correction table 233 when the electronic device 100 is mounted at a second mounting angle on the cover.

In operation 509, when an event occurs, the processor 220 (e.g., the pen data correcting unit 223 and the input processing unit 225) may determine whether the occurring event is a pen input event. When the occurring event is not the pen input event (when a different input event is received instead of the pen input event), in operation 511, the processor 220 may perform a function based on the type of the occurring event. For example, the processor 220 may perform a file reproducing function, a communicating function, a web-surfing function, or the like depending on the type of the event.

When the reception of the pen input occurs, in operation 513, the processor 220 (e.g., the pen data correcting unit 223 and the input processing unit 225) may process the pen input by applying the selected correction table. For example, the processor 220 may deal with the pen input error, based on a selected correction table, such as the basic correction table or the correction table selected depending on the mounting angle.

As described above, according to various embodiments, a method for processing a pen input according to an embodiment may include receiving a pen input, determining whether hall sensing information is received from at least one hall sensor, selecting any one correction table of at least one correction table configured to correct pen data at mutually different positions based on parts of an electromagnetic induction panel corresponding to that the hall sensing information is received, and correcting pen data, which corresponds to the received pen input, based on the selected correction table.

According to various embodiments, the selecting of the correction table may include determining a type of an accessory based on the hall sensing information and selecting a correction table corresponding to the type of the accessory.

According to various embodiments, the selecting of the correction table may include determining an arrangement state between the accessory and an electronic device based on identification information of the hall sensor and selecting a correction table corresponding to the arrangement state.

According to various embodiments, the selecting of the correction table may include determining the arrangement state of the electronic device based on sensing information associated with movement of the electronic device or arrangement state determination of the electronic device and selecting a correction table corresponding to the arrangement state of the electronic device.

According to various embodiments, the selecting of the correction table may include determining a type of a cover including at least a part of a magnet member or a metal member that affects detection of the pen input based on the hall sensing information and selecting a specified correction table based on the type of the cover.

According to various embodiments, the selecting of the correction table may include determining a mounting state of the electronic device to the cover including at least a part of the magnet member or the metal member that affects the detection of the pen input based on the hall sensing information and selecting a specified correction table based on the mounting state.

According to various embodiments, the method may further include outputting information associated with whether the cover is connected or the correction table is changed.

Figure 6:
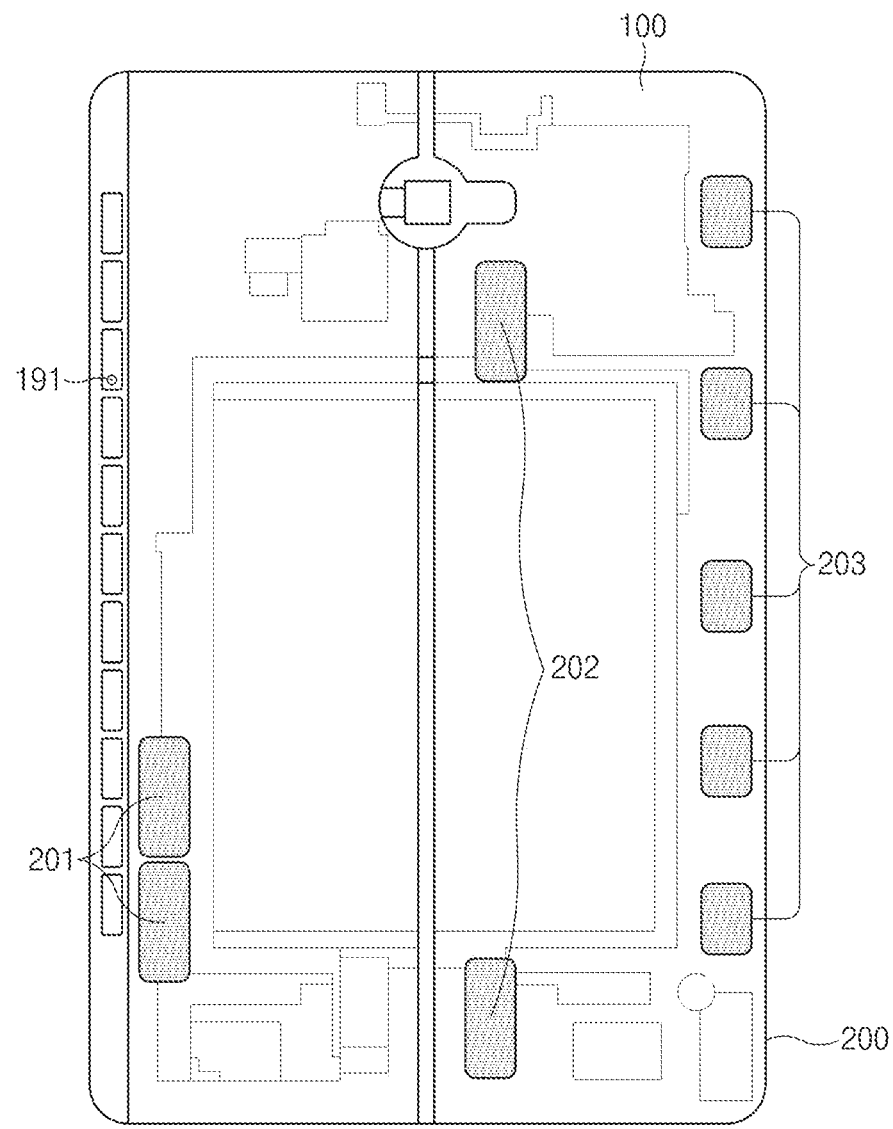
FIG. 6 is a view schematically illustrating an appearance of an electronic device, according to an embodiment of the present invention.

FIG. 6 is a view schematically illustrating an appearance of an electronic device, according to an embodiment of the present invention.

Referring to FIG. 6, according to the present invention, the electronic device 100 may include a housing 200, at least one of magnet members 201, 202, and 203 provided inside the housing 200, and the first hall sensor 191. Additionally or alternatively, the electronic device 100 may further include a printed circuit board which is mounted inside the housing 200 and has a processor and a memory mounted thereon, a display, a battery, or the like.

The magnet members 201, 202, and 203 may include, for example, based on the drawings, first magnet members 201 arranged at the left edge of the housing 200, second magnet members 202 disposed slightly right from the center of the electronic device 100, and third magnet members 203 disposed at the right edge of the electronic device 100. The magnet members 201, 202, and 203 may be disposed at positions corresponding to magnets embedded in an accessory (e.g., a cover or a book cover) to be coupled. According to various embodiments, the above-described magnet members 201, 202, and 203 may be arranged such that magnetic force is generated toward the back surface of the electronic device 100.

The first hall sensor 191, which is disposed inside the housing 200, may be disposed at the left edge. In addition, the first hall sensor 191 may be arranged in parallel to the first magnet members 201 in a vertical direction.

In the above-description, although it is illustrated that the first hall sensor 191 may be disposed at the upper portion of the left edge of the housing 200, the present invention is not limited thereto. For example, the first hall sensor 191 may be disposed on the center of the left edge of the housing 200. The first hall sensor 191 may be electrically connected with the processor of the electronic device 100 or electrically connected with the pen IC associated with the operation of the electronic pen of the electronic device 100. The pen IC may be mounted on the printed circuit board or may be arranged at a predetermined position inside the housing 200.

Figure 7:
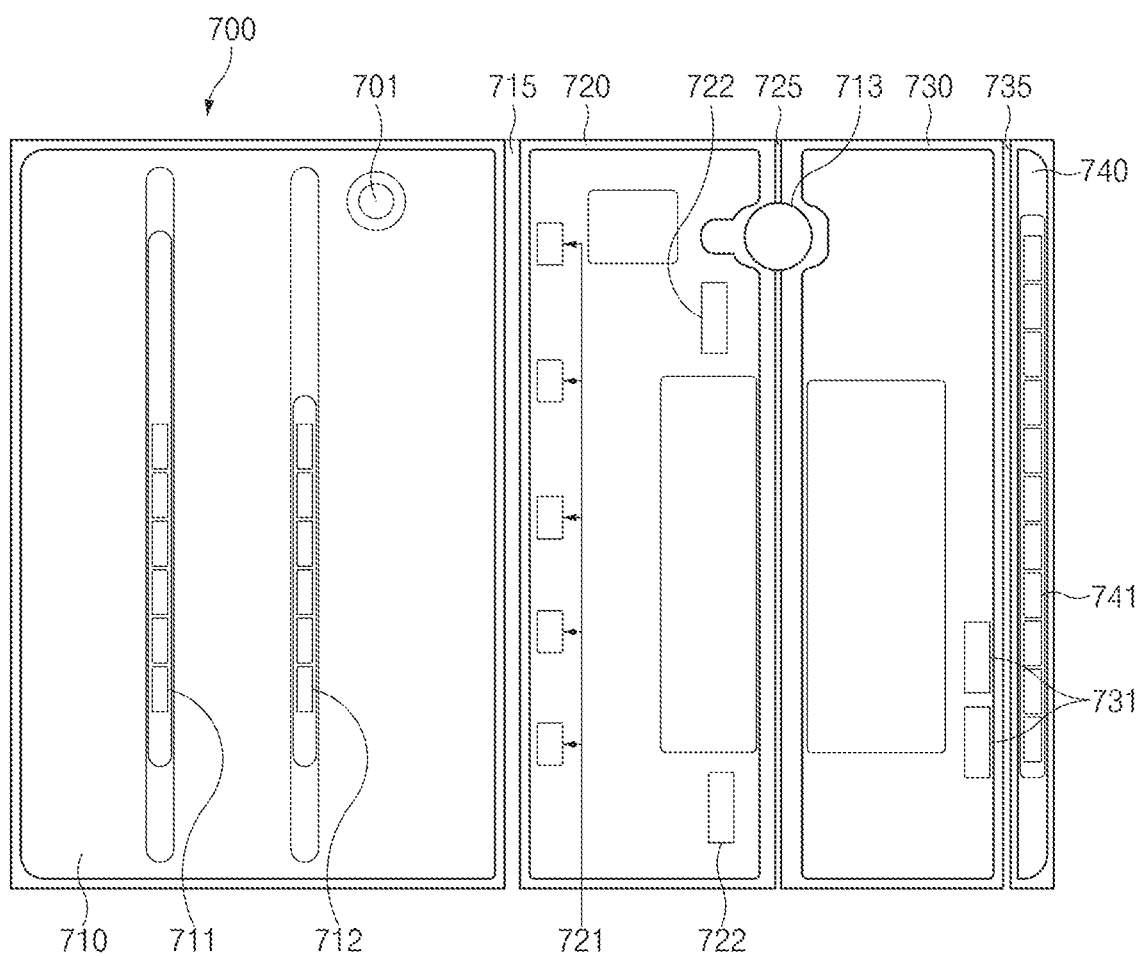
FIG. 7 is a view illustrating one example of a first type of a cover that is connectable with an electronic device, according to an embodiment of the present invention.

FIG. 7 is a view illustrating a first type of a cover that is connectable with an electronic device, according to an embodiment of the present invention.

Referring to FIG. 7, according to the present invention, a first type of a cover 700 may include a mounting part 710, a coupling part 720, a support part 730, a fixing part 740, a first hinge part 715, a second hinge part 725, and a third hinge part 735.

The mounting part 710 may have the size corresponding to the size of the front surface of the electronic device 100 or the size slightly larger or smaller than the size of the front surface of the electronic device 100. The mounting part 710 may include first mounting magnet members 711 and second mounting magnet members 712 arranged in parallel to each other in a vertical direction.

The first mounting magnet members 711 may include magnets having a plurality of magnet members continuously aligned in line in the vertical direction or may include a bar magnet disposed while extending in the vertical direction with a specific length. The second mounting magnet members 712 are arranged in parallel to the first mounting magnet members 711 and spaced apart from the first mounting magnet members 711 by a specific distance. The first mounting magnet members 711 and the second mounting magnet members 712 may be interposed between an upper plate and a lower plate combined with each other. Accordingly, the first mounting magnet members 711 and the second mounting magnet members 712 may not be observed from the outside. The first mounting magnet members 711 may be disposed through magnet-coupling to the fixing part 740 at a position that the coupling part 720 and the support part 730 are fixed while forming a first angle therebetween. The second mounting magnet members 712 may be disposed through magnet-coupling to the fixing part 740 at a position that the coupling part 720 and the support part 730 are fixed while forming a second angle therebetween. In addition, a support panel (e.g., a plastic panel) having a specific thickness and a specific strength may be disposed inside the mounting part 710 (between the upper plate and the lower place).

According to various embodiments, the first cover 700 may further include a hall sensing magnet 701. The hall sensing magnet 701 may be disposed to face the hall sensor and the hall IC disposed in the electronic device 100 while the mounting part 710 is disposed to cover the front surface of the electronic device 100. Accordingly, the electronic device 100 may determine specified cover connection and a cover arrangement state (e.g., the mounting part 710) corresponding to the detection of the magnetic force of the hall sensing magnet 701.

The coupling part 720 may be connected with the mounting part 710 through the first hinge part 715 and may rotate about the first hinge part 715 toward the front surface or the back surface of the mounting part 710. The coupling part 720 may, for example, include first coupling magnet members 721 and a second coupling magnet member 722. The first coupling magnet members 721 may be magnet-coupled to the third magnet members 203 described above with reference to FIG. 6, when the electronic device 100 is mounted. In addition, the second coupling magnet members 722 may be magnet-coupled with the second magnet members 202 described above with reference to FIG. 6, when the electronic device 100 is mounted. The first coupling magnet members 721 and the second coupling magnet members 722 are fixedly interposed between the upper plate and the lower plate such that the first coupling magnet members 721 and the second coupling magnet members 722 are not observed from the outside. A panel (e.g., a plastic panel the same as a panel arranged inside the mounting part 710) having a specific thickness and specific strength may be disposed inside the coupling part 720 (between the upper plate and the lower place).

At least one side of the first hinge part 715 may be coupled to the right edge of the mounting part 710 based on a drawing and at least an opposite side of the first hinge part 715 may be coupled to a left edge of the coupling part 720 based on a drawing. The first hinge part 715 may be provided with a material, such as leather, having a specific tension or may be provided as the upper plate and the lower plate of the mounting part 710 or the coupling part 720 are combined. The mounting part 710 may be pivoted about the first hinge part 715 toward the front surface or the back surface of the coupling part 720.

The support part 730 may be disposed adjacent to the coupling part 720, and coupled to the coupling part 720 such that the support part 730 may be hinged through the second hinge part 725. Support magnet members 731 may be disposed inside the support part 730. The support magnet members 731 may be magnet-coupled to the first magnet members 201 disposed in the electronic device 100 when the electronic device 100 is mounted on the coupling part 720.

According to various embodiments, when the coupling part 720 and the support part 730 are mounted at a specified angle (e.g., an angle less than 180 degrees), the support magnet members 731 may be spaced apart from each other without being magnet-coupled with the electronic device 100. Alternatively, when the electronic device 100 is disposed on the front surface of the coupling part 720 and the front surface of the support part 730 (e.g., when the coupling part 720 and the support part 730 are disposed with respect to each other at 180 degrees), the support magnet members 731 may be magnet-coupled to the first magnet members 201 of the electronic device 100. Since the support magnet members 731 are positioned at the edge of the electronic device 100, the sensing error of the electromagnetic induction panel 183 of the electronic device 100 may be caused. The support part 730 may include an upper plate and a lower place and may include a panel having a specific thickness and specific strength between the upper plate and the lower plate. The panel may be provided in a remaining area other than an area that the magnet members are disposed.

One side of the second hinge part 725 may be coupled to an opposite edge of the coupling part 720 (e.g., a right edge of the coupling part 720 based on the drawing) and an opposite side of the second hinge part 725 may be coupled to one edge (e.g., a left edge of the support part 730 based on the drawing) of the support part 730. The second hinge part 725 may move such that the support part 730 rotates at a specific angle toward the back surface of the coupling part 720, in the state that the coupling part 720 is fixed. The angle that the second hinge part 725 is pivoted or hinged may be determined through the magnet coupling between the fixing part 740 and first mounting magnet members 711 or the magnet coupling between the fixing part 740 and second mounting magnet members 712. The second hinge part 725 may be provided by combining the upper plate and the lower plate with each other, similarly to the first hinge part 715.

Additionally, according to various embodiments, a camera hole 713 may be provided among the coupling part 720, the support part 730, and the second hinge part 725. The camera hole 713 may be provided in a position corresponding to a camera position of the electronic device 100, which is mounted, to expose a lens of a camera to the outside. Accordingly, even if the electronic device 100 is provided on the coupling part 720 and the support part 730, the camera disposed on the back surface of the electronic device 100 may be exposed to the outside through the camera hole 713 to perform a photographing function.

The fixing part 740 may be provided adjacent to the support part 730, and may be coupled to the support part 730 through a third hinge part 735. The fixing part 740 may include, for example, fixing magnet members 741. The fixing magnet members 741 may be substantially magnet-coupled to the first mounting magnet members 711 or the second mounting magnet members 712. The fixing magnet members 741 may be provided by aligning magnets having a specific size in line in the vertical direction or by arranging a bar magnet in the vertical direction. The fixing part 740 may include an upper plate, a lower plate, a panel interposed between the upper plate and the lower plate. The panel may be provided in size and shape of a remaining area other than an area that the first mounting magnet members 711 are provided.

The third hinge part 735 may be interposed between the support part 730 and the fixing part 740 and may be provided such that the fixing part 740 is rotatable at a specific angle toward the front surface or the back surface of the support part 730. The second hinge part 735 may be provided by combining the upper plate and the lower plate with each other, similarly to the first hinge part 715.

Figure 8:
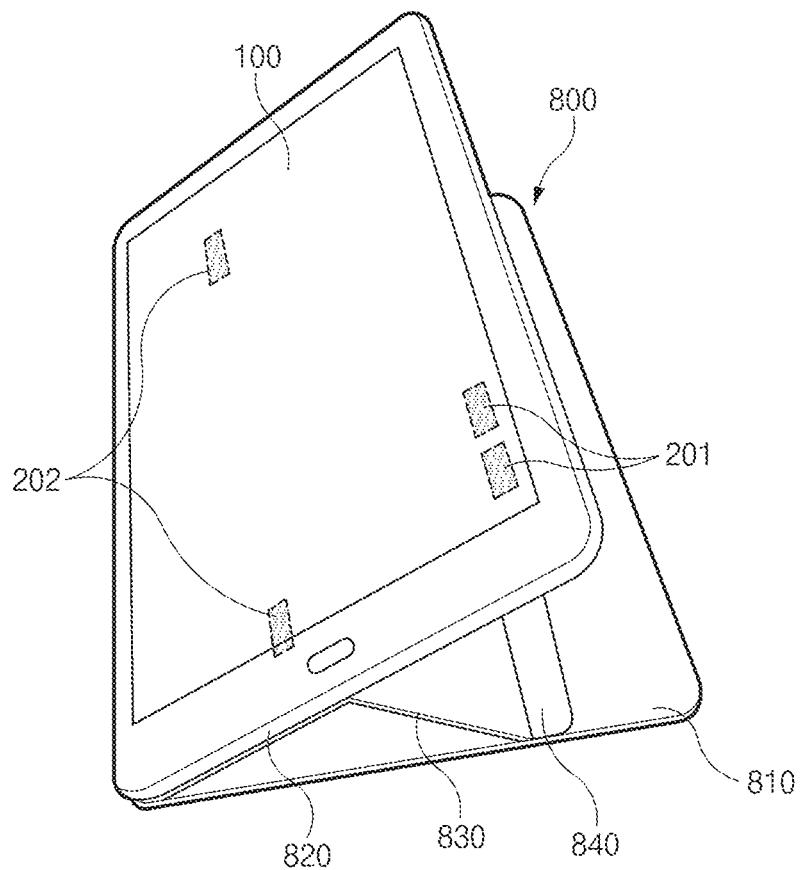
FIG. 8 is a view illustrating a form that a first type of cover is connected with the electronic device, according to an embodiment of the present invention.

FIG. 8 is a view illustrating one example of the form that the first type of the cover is connected with the electronic device 100, according to an embodiment of the present invention.

Referring to FIG. 8, a lower area of the back surface of the electronic device 100 may be magnet-coupled to a coupling part 820 of a first type of a cover 800. For example, when the third magnet members 203 provided at on the lower area of the back surface of the electronic device 100 is disposed at a specific angle, the third magnet members 203 may be magnet-coupled to the first coupling magnet members 821 disposed in the coupling part 820. In addition, the second magnet members 202 provided at on the central area of the back surface of the electronic device 100 may be magnet-coupled to the second coupling magnet members 822 disposed in the coupling part 820.

A fixing part 840 of the cover 800 may be magnet-coupled to first mounting magnet members (e.g., first mounting magnet members 711 of FIG. 7) or second mounting magnet members (e.g., second mounting magnet members 712 of FIG. 7) of a mounting part 810. Accordingly, a support part 830 disposed adjacent to the fixing part 840 and the coupling part 820 of the cover 800 may be disposed to support each other at a specific angle. Regarding the above-described structure, the mounting part 810 may be disposed to perform a hinge action (or pivot action) about a hinge part (e.g., a hinge part 715 of FIG. 7) toward the back surface of the coupling part 820.

The coupling part 820 may include, for example, the first coupling magnet members 721 and the second coupling magnet members 722 described with reference to FIG. 7. Accordingly, in the state that the cover 800 is arranged, the electronic device 100 may receive an magnetic flux influence exerted by the first coupling members and the second coupling members of the coupling part 820 coupled to the lower area of the back surface of the electronic device 100. When a structure (e.g., a metal substrate) to suppress the magnetic force from the second magnet members 202 and the third magnet members 203 is disposed on the back surface of the electronic device 100, the influences may not be exerted by the magnet members included in the coupling part 820 and magnet members disposed on the back surface of the electronic device 100. The electromagnetic induction panel 183 may relatively significantly receive the magnetic influence by the first magnet members 201. Since the magnetic influence by the first magnet members 201 is made regardless of whether the cover 800 is connected, the processor 220 of the electronic device 100 may apply the basic correction table (e.g., the first correction table 231) corresponding to the above-described mounting state.

Figure 9:
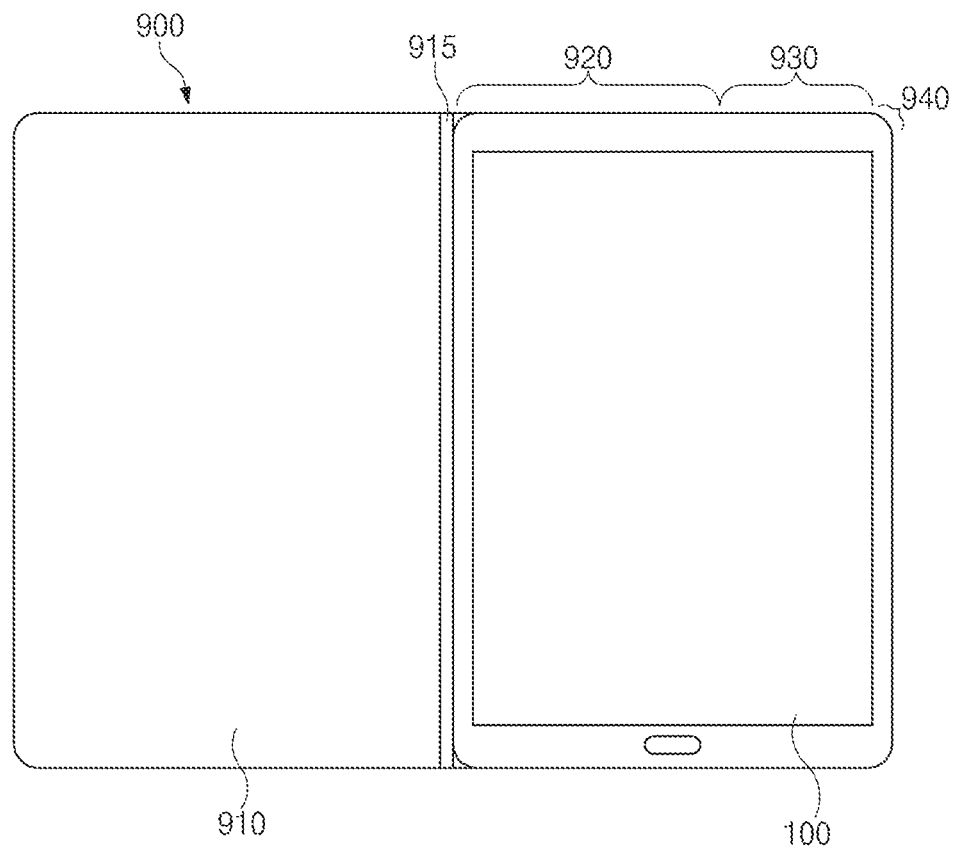
FIG. 9 is a view illustrating another form that the first type of cover is connected with an electronic device, according to an embodiment of the present invention.

FIG. 9 is a view illustrating another form that the first type of the cover is connected with the electronic device, according to an embodiment of the present invention.

Referring to FIG. 9, as illustrated in the drawing, the back surface of the electronic device 100 may be disposed on a coupling part 920, a support part 930, and a fixing part 940 of a cover 900, in the state that a mounting part 910, the coupling part 920, the support part 930, and the fixing part 940 of the cover 900 are horizontally arranged. The support part 930 may include support magnet members 731 described above with reference to FIG. 7. In this case, the first magnet members 201 disposed on the back surface of the electronic device 100 may be magnet-coupled to support magnet members disposed in the support part 930. In addition, the coupling part 920 may include first coupling magnet members 721 and second coupling magnet members 722 described above with reference to FIG. 7. Accordingly, the first coupling magnet members and the second coupling magnet members disposed in the coupling part 920 may be magnet-coupled to the second magnet members 202 and the third magnet members 203 which are disposed on the back surface of the electronic device 100, respectively. Meanwhile, the fixing part 940 may include fixing magnet members 741 described with reference to FIG. 7. Accordingly, the fixing magnet members disposed in the fixing part 940 may be disposed at a lower portion of the edge of the back surface of the electronic device 100. Electric magnetic fields may be generated from the first magnet members 201, the support magnet members, and the fixing magnet members at the right edge of the electronic device 100, and thus may exert an influence on the right edge of the electromagnetic induction panel 183 of the electronic device 100. In this case, the first hall sensor 191 arranged in parallel to the first magnet members 201 of the electronic device 100 in the vertical direction may transmit hall sensing information to the processor 220 as the fixing magnet members approach.

When receiving the hall sensing information from the first hall sensor 191, the processor 220 of the electronic device 100 may recognize the support magnet members and the fixing magnet members at the right edge of the electronic device 100 as being additionally arranged, and may select a specified sub-correction table (e.g., the second correction table 232) corresponding to the recognition, thereby processing a pen input. According to an embodiment, when the pen input occurs, the processor 220 may determine whether the hall sensing information is received from the first hall sensor 191 and may determine whether the sub-correction table is applied, based on whether the hall sensing information is received. Alternatively, when the hall sensing information is received from the first hall sensor 191, the processor 220 may control a pen IC to select the sub-correction table. Accordingly, when the pen input occurs, the pen IC may correct pen data corresponding to the pen input based on the sub-correction table and then may transmit the corrected pen data to the processor 220.

Figure 10:
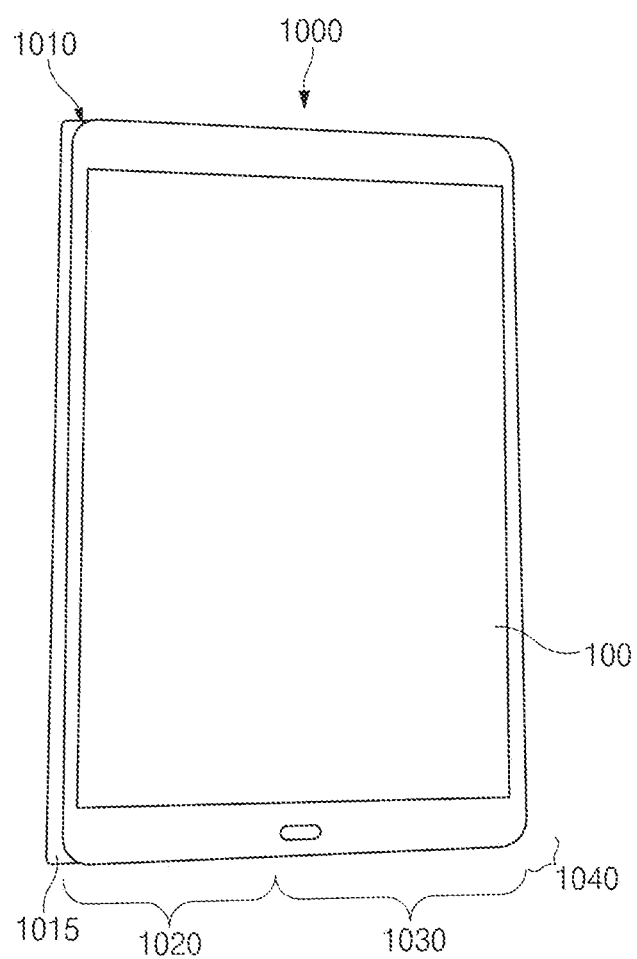
FIG. 10 is a view illustrating another form that the first type of cover is connected with an electronic device, according to an embodiment of the present invention.

FIG. 10 is a view illustrating still another form that the first type of the cover is connected with the electronic device 100, according to an embodiment of the present invention.

Referring to FIG. 10, a cover 1000 may be arranged such that a mounting part 1010 may be pivoted about a first hinge part 1015 toward the back surface of a coupling part 1020 to overlap with the coupling part 1020. Accordingly, the back surface of the mounting part 1010 may be disposed to face the back surface of the coupling part 1020, a support part 1030, and a fixing part 1040. The back surface of the electronic device 100 may be mounted on the coupling part 1020, the support part 1030, and the fixing part 1040 as described with reference to FIG. 9.

Even in the above-described mounting state, as described with reference to FIG. 9, there may occur the influence of the magnetic force by the first magnet members 201, the support magnet members, and the fixing magnet members disposed at the right edge of the electronic device 100. When receiving the hall sensing information from the first hall sensor 191, the processor 220 (or 120) may process magnetic force correction based on the sub-correction table (e.g., the second correction table 232) specified based on the hall sensing information.

Figure 11:
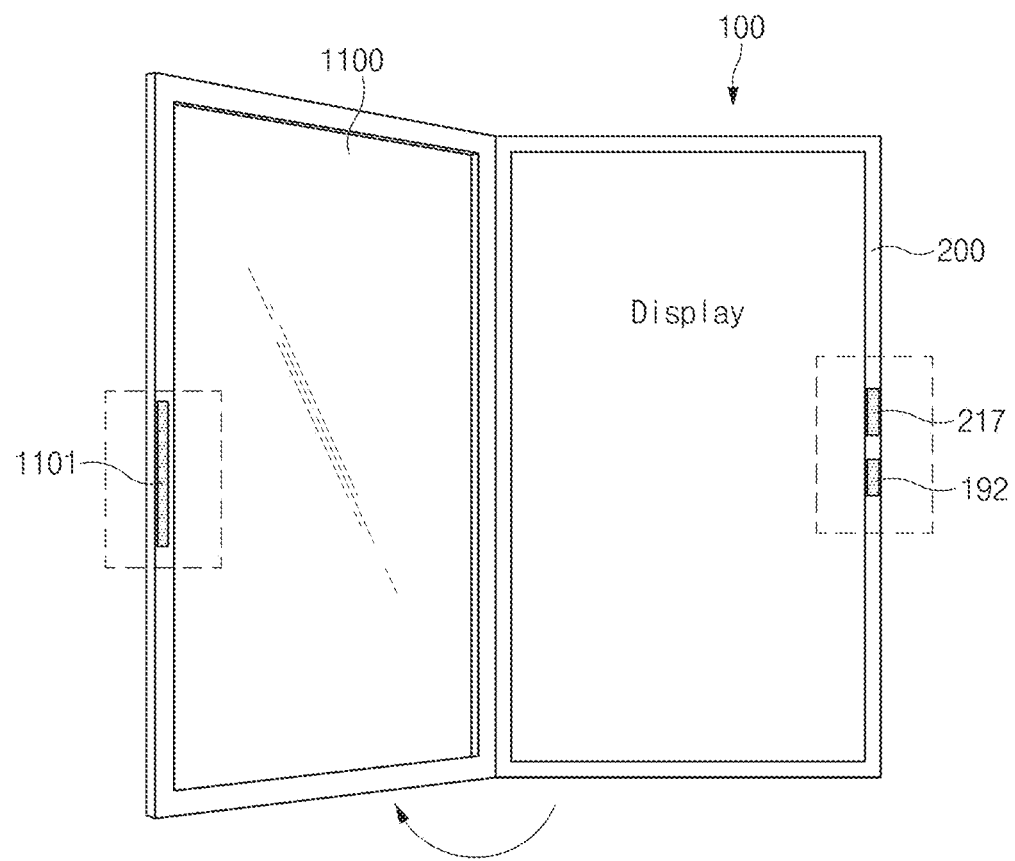
FIG. 11 is a view illustrating a form that a second type of cover is connected with the electronic device, according to an embodiment of the present invention.

FIG. 11 is a view illustrating one form that the second type of the cover is connected with the electronic device, according to an embodiment of the present invention.

Referring to FIG. 11, the electronic device 100 may be coupled to a cover 1100. The cover 1100 may have, for example, a structure in which one-side edge (e.g., the right edge based on the drawing) of the cover 1100 is coupled to one-side edge (e.g., the left edge of the electronic device 100 based on the drawing) of the electronic device 100. The cover 1100 may include a first coupling magnet member 1101 having a first size and disposed at the center of the left edge of the cover 1100. The cover 1100 is transparently provided in at least a portion or an entire portion thereof. Accordingly, even if the cover 1100 overlaps with the front surface of the electronic device 100, the cover 1100 may assist that the display disposed on the front surface of the electronic device 100 is viewed from the outside through the transparent area.

The electronic device 100 may include, for example, the second coupling magnet member 217, which is able to be magnet-coupled to the first coupling magnet member 1101, at the right edge of the housing 200. In addition, a second hall sensor 102 may be provided at one-side position of the housing 200 in the electronic device 100 to detect the magnetic force from the first coupling magnet member 1101, while the first coupling magnet member 1101 is coupled to the second coupling magnet member 217. For example, the second hall sensor 192 is spaced apart from the second coupling magnet member 217 by a predetermined distance to detect the change in magnetic force or magnetic flux, which is generated as the first coupling magnet member 1101 approaches, without exerting an influence to magnetic force from the second coupling magnet member 217.

As in the above-described, when the second hall sensor 192 disposed in a second position (e.g., the center of the edge of the housing 200) transmits hall sensing information to the processor (see 120 or 220) as the second hall sensor 192 senses the magnetic force, the processor 220 may determine that the second type of a cover 1100 is connected with the electronic device 100. Accordingly, the processor 220 may correct the magnetic force by the first coupling magnet member 1101 and the second coupling magnet member 217, which is generated from the central area of the right edge of the housing. For example, the processor 220 may perform a control operation to process a pen input by applying the sub-correction table based on the connection of the cover 1100. The sub-correction table may include, for example, values to compensate for voltage drop caused by the magnetic force generated from the right edge of the electronic device 100 that the first coupling magnet member 1101 is coupled to the second coupling magnet member 217.

Figure 12:
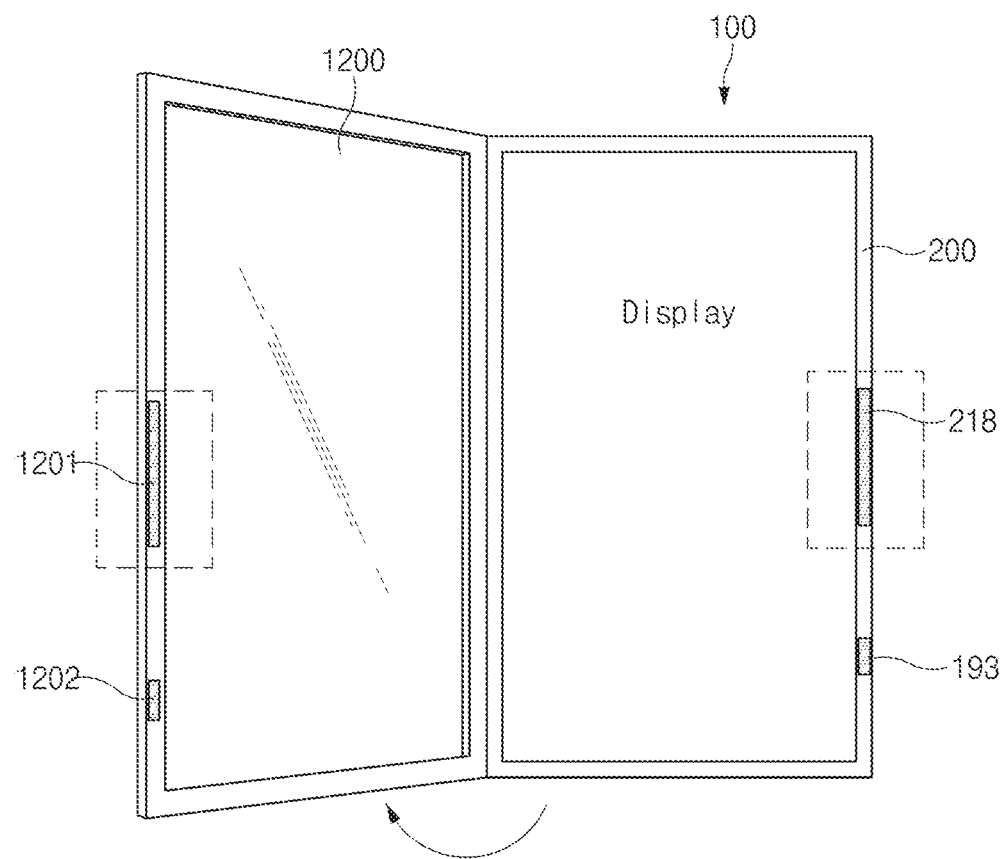
FIG. 12 is a view illustrating a form that a third type of cover is connected with the electronic device, according to an embodiment of the present invention.

FIG. 12 is a view illustrating one form that a third type of the cover is connected with the electronic device, according to an embodiment of the present invention.

Referring to FIG. 12, the third type of a cover 1200 may be provided transparently in at least a portion thereof, and may have a first coupling magnet member 1201, which is to be coupled to the electronic device 100, and a sensing magnet member 1202, which is used for hall sensing, arranged at partial areas of the edge (e.g., partial areas of the left edge) of the cover 1200. The third cover 1200 may have, for example, a structure coupled to a side portion of the electronic device 100. The third cover 1200 may perform a hinge action (or a pivot action) at a portion of the third cover 1200 coupled with the electronic device 100. Accordingly, the third cover 1200 may be disposed to be overlap with the front surface and the back surface of the electronic device 100.

The electronic device 100 may include a second coupling magnet member 218 disposed at one side of the housing 200 and a third hall sensor 193 disposed at a specified position for hall sensing. According to an embodiment, the second coupling magnet member 218 of the electronic device 100 may be disposed with a specific length and a specific width at the central area of the right edge of the housing 200. The second coupling magnet member 218 may have, for example, substantially the same size as that of the first coupling magnet member 1201 disposed on the third cover 1200. The third hall sensor 193 may be disposed at one side of the housing 200 overlapping with the sensing magnet member 1202 disposed at one side of the third cover 1200, in the state that the third cover 1200 is disposed to cover the front surface of the electronic device 100. The third hall sensor 193 may be sufficiently spaced apart from the second coupling magnet member 218, such that the sensing error is not caused by the second coupling magnet member 218, and may detect sensing information used to determine the connection state of the third cover 1200 or the closing state of the third cover 1200.

When receiving hall sensing information from the third hall sensor 193 disposed at a third position, the processor (see 120 or 220) of the electronic device 100 may determine that the third type of the cover 1200 is connected, and may perform a process to apply a specified sub-correction table. The sub-correction table may include, for example, values for compensating for voltage distortion caused by magnetic force at the first area of the right edge, which is distorted by the first coupling magnet member 1201 and the second coupling magnet member 218, and magnetic force at the second area of the right edge, which is distorted by the sensing magnet member 1202.

Figure 13:
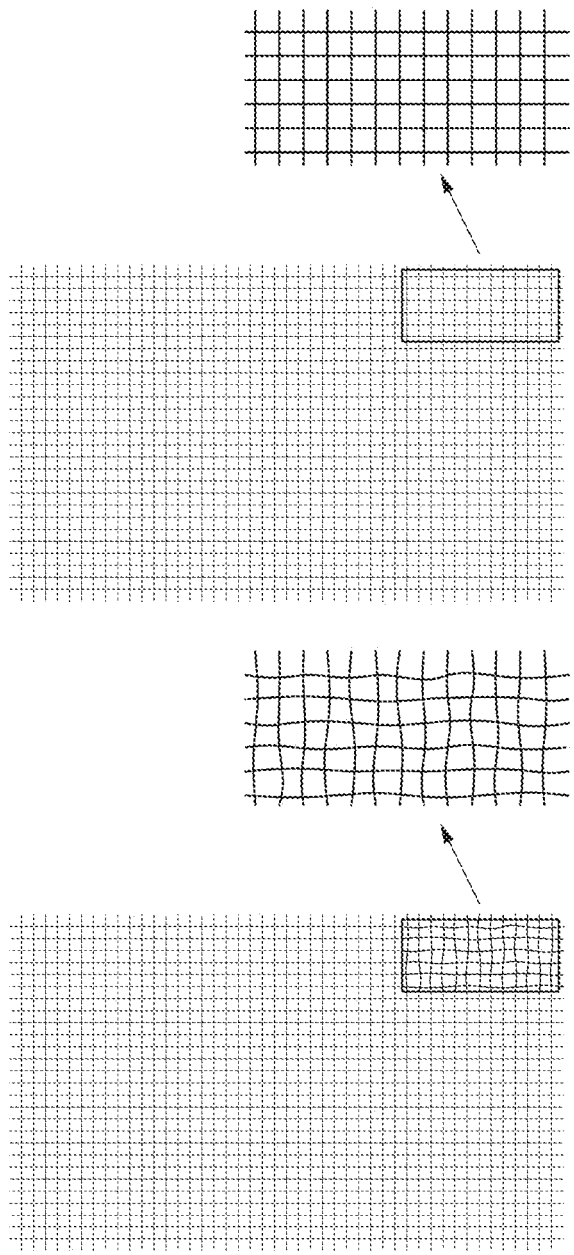
FIG. 13 is a view illustrating the state that a pen input error is corrected, according to an embodiment of the present invention.

FIG. 13 is a view illustrating the state that the pen input error is corrected, according to an embodiment of the present invention.

Referring to FIG. 13, as in state 1301, the electromagnetic induction panel 183 of the electronic device 100 may have distortion caused by magnetic force, when a specified correction table is not applied. For example, as described above, as the cover 700 is coupled to the electronic device 100, a distortion phenomenon may be caused as illustrated in drawing when the fixing magnet members 741 or the support magnet members 731 disposed in the cover 700 exert an influence on the electromagnetic induction panel 183.

The processor (see 120 or 220) may select a specified correction table and may transmit the specified correction table to the pen IC 180. The pen IC 180 may process pen data from a pen input, based on the selected correction table and may transmit the pen data to the processor 120 or 220. In this case, as in state 1303, correction of pen data is processed, and thus a signal having substantially the same waveform as that in another region may be detected.

Figure 14:
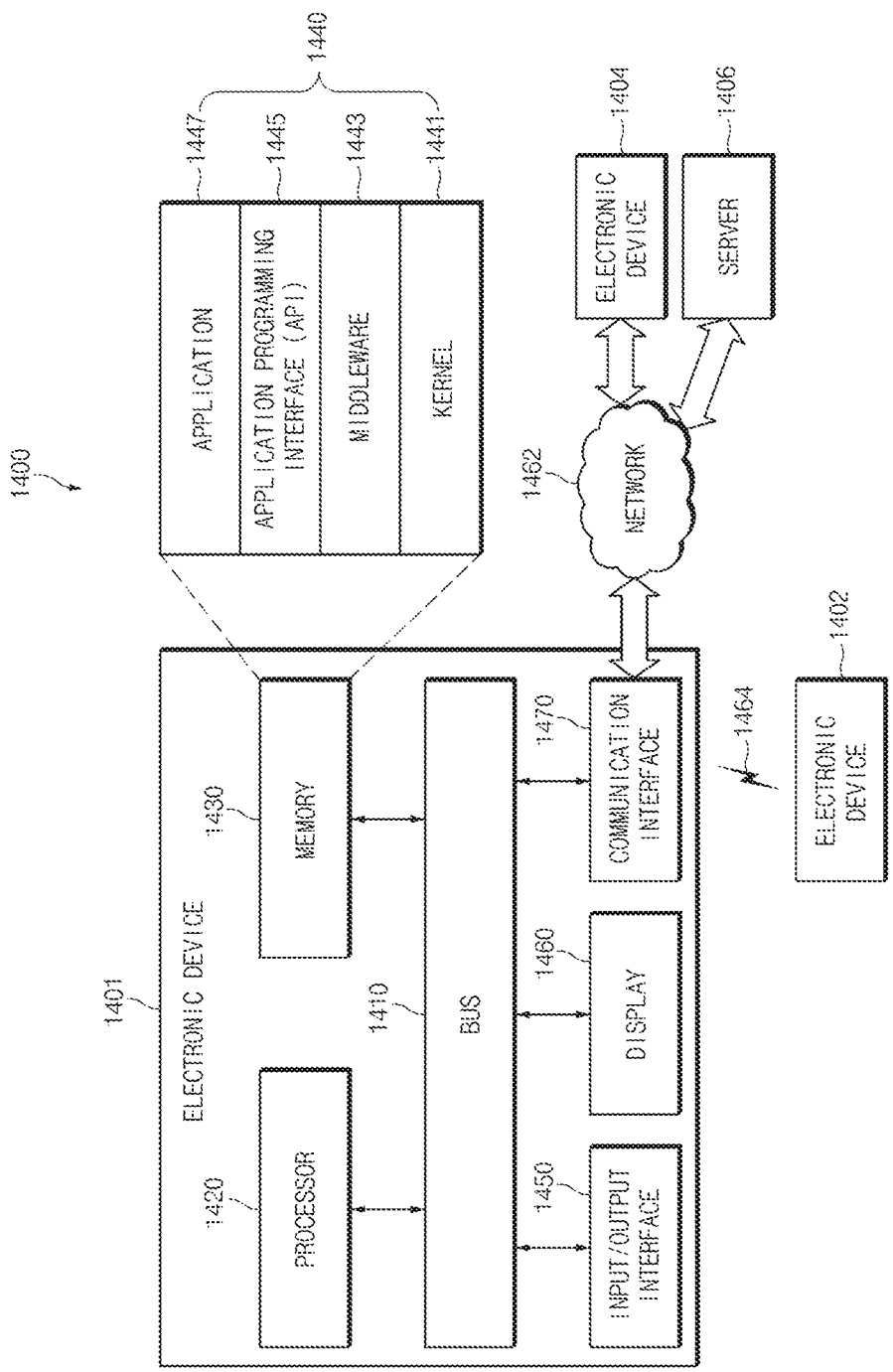
FIG. 14 is a view illustrating one example of an electronic device operating environment, according to an embodiment of the present invention.

FIG. 14 illustrates an example of an electronic device operating environment, according to an embodiment of the present disclosure.

Referring to FIG. 14, according to various embodiments, an electronic device 1401 in a network environment 1400 is described. The electronic device 1401 may include a bus 1410, a processor 1420, a memory 1430, an input/output interface 1450, a display 1460, and a communication interface 1470. According to an embodiment, the electronic device 1401 may not include at least one of the above-described components or may further include other component(s). The bus 1410 may interconnect the above-described components 1420 to 1470 and may include a circuit for conveying communications (e.g., a control message or data) among the above-described components. The processor 1420 (e.g., the processor of the electronic device 100) may include one or more of a central processing unit (CPU), an application processor (AP), or a communication processor (CP). For example, the processor 1420 may perform an arithmetic operation or data processing associated with control and/or communication of at least other components of the electronic device 1401.

The memory 1430 may include a volatile and/or nonvolatile memory. For example, the memory 1430 may store commands or data associated with at least one other component(s) of the electronic device 1401. According to an embodiment, the memory 1430 may store software and/or a program 1440. The program 1440 may include, for example, a kernel 1441, a middleware 1443, an application programming interface (API) 1445, and/or an application program (or "an application") 1447. At least a part of the kernel 1441, the middleware 1443, or the API 1445 may be referred to as an "operating system (OS)". For example, the kernel 1441 may control or manage system resources (e.g., the bus 1410, the processor 1420, the memory 1430, and the like) that are used to execute operations or functions of other programs (e.g., the middleware 1443, the API 1445, and the application program 1447). Furthermore, the kernel 1441 may provide an interface that allows the middleware 1443, the API 1445, or the application program 1447 to access discrete components of the electronic device 1401 so as to control or manage system resources.

The middleware 1443 may perform, for example, a mediation role such that the API 1445 or the application program 1447 communicates with the kernel 1441 to exchange data. Furthermore, the middleware 1443 may process task requests received from the application program 1447 according to a priority. For example, the middleware 1443 may assign the priority, which makes it possible to use a system resource (e.g., the bus 1410, the processor 1420, the memory 1430, or the like) of the electronic device 1401, and may process the one or more task requests. The API 1445 may be an interface through which the application program 1447 controls a function provided by the kernel 1441 or the middleware 1443, and may include, for example, at least one interface or function (e.g., an instruction) for a file control, a window control, image processing, a character control, or the like. The input/output interface 1450 may transmit a command or data input from a user or another external device, to other component(s) of the electronic device 1401 or may output a command or data, received from other component(s) of the electronic device 1401, to a user or another external device.

The display 1460 may include, for example, a liquid crystal display (LCD), a light-emitting diode (LED) display, an organic LED (OLED) display, a microelectromechanical systems (MEMS) display, or an electronic paper display. The display 1460 may display, for example, various contents (e.g., a text, an image, a video, an icon, a symbol, and/or the like) to a user. The display 1460 may include a touch screen and may receive, for example, a touch, gesture, proximity, or hovering input using an electronic pen or a part of a user's body.

For example, the communication interface 1470 may establish communication between the electronic device 1401 and an external device (e.g., the first external electronic device 1402, the second external electronic device 1404, or the server 1406). For example, the communication interface 1470 may be connected to the network 1462 over wireless communication or wired communication to communicate with the external device (e.g., the second external electronic device 1404 or the server 1406).

The wireless communication may include cellular communication which uses at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like. According to an embodiment, the wireless communication may include, for example, at least one of wireless fidelity (Wi-Fi), Bluetooth, Bluetooth low energy (BLE), Zigbee, near field communication (NFC), magnetic secure transmission (MST), radio frequency (RF), body area network, or the like. According to an embodiment, the wireless communication may include a global navigation satellite system (GNSS). The GNSS may include a global positioning system (GPS), a global navigation satellite system (Glonass), a Beidou navigation satellite system (hereinafter referred to as "Beidou"), or an European global satellite-based navigation system (hereinafter referred to as "Galileo"). Hereinafter, in the present disclosure, "GPS" and "GNSS" may be interchangeably used. The wired communication may include at least one of, for example, a universal serial bus (USB), a high definition multimedia interface (HDMI), a recommended standard-232 (RS-232), power-line communication, a plain old telephone service (POTS), or the like. The network 1462 may include at least one of telecommunications networks, for example, a computer network (e.g., LAN or WAN), an Internet, or a telephone network. Alternatively, the electronic device 1401 may communicate with the first electronic device 1402 based on short range communication 1464.

Each of the first and second external electronic devices 1402 and 1404 may be a device of which the type is different from or the same as that of the electronic device 1401. According to various embodiments, all or a portion of operations that the electronic device 1401 will perform may be executed by another or plural electronic devices (e.g., the electronic device 1402 or 1404 or the server 1406). According to an embodiment, in the case where the electronic device 1401 executes any function or service automatically or in response to a request, the electronic device 1401 may not perform the function or the service internally, but, alternatively additionally, it may request at least a portion of a function associated with the electronic device 1401 from another device (e.g., the electronic device 1402 or 1404 or the server 1406). The other electronic device (e.g., the electronic device 1402 or 1404 or the server 1406) may execute the requested function or additional function and may transmit the execution result to the electronic device 1401. The electronic device 1401 may provide the requested function or service using the received result or may additionally process the received result to provide the requested function or service. To this end, for example, cloud computing, distributed computing, or client-server computing may be used.

Figure 15:
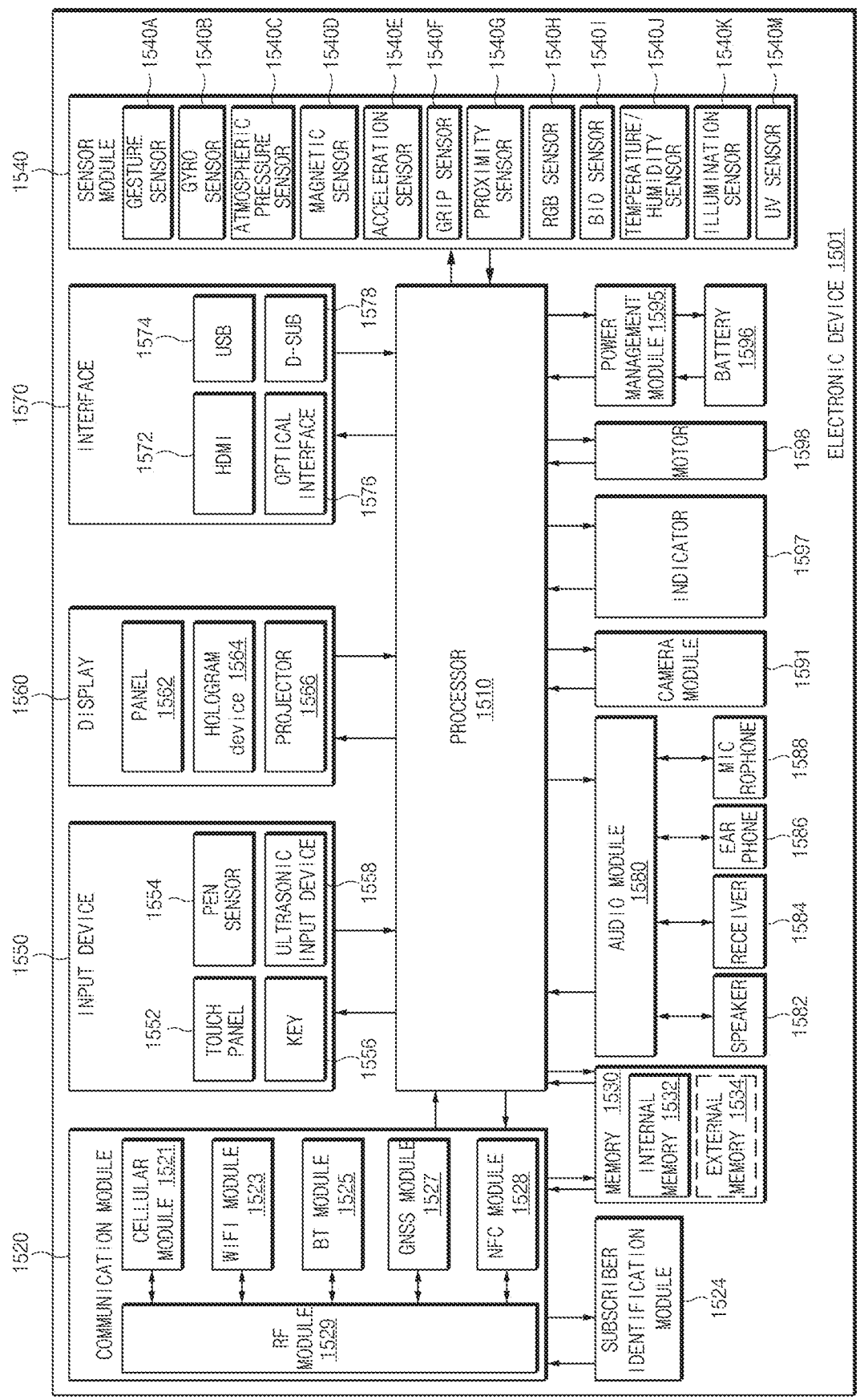
FIG. 15 is a block diagram of an electronic device, according to various embodiments.

FIG. 15 illustrates a block diagram of an electronic device, according to various embodiments.

An electronic device 1501 may include, for example, all or a part of the electronic device 1401 illustrated in FIG. 14. The electronic device 1501 may include one or more processors (e.g., an application processor (AP)) 1510, a communication module 1520, a subscriber identification module 1524, a memory 1530, a sensor module 1540, an input device 1550, a display 1560, an interface 1570, an audio module 1580, an iris camera module 1591, a power management module 1595, a battery 1596, an indicator 1597, and a motor 1598. The processor 1510 may drive, for example, an operating system (OS) or an application to control a plurality of hardware or software components connected to the processor 1510 and may process and compute a variety of data. For example, the processor 1510 may be implemented with a System on Chip (SoC).

According to an embodiment, the processor 1510 may further include a graphic processing unit (GPU) and/or an image signal processor. The processor 1510 may include at least a part (e.g., a cellular module 1521) of components illustrated in FIG. 15. The processor 1510 may load a command or data, which is received from at least one of other components (e.g., a nonvolatile memory), into a volatile memory and process the loaded command or data. The processor 1510 may store result data in the nonvolatile memory.

The communication module 1520 may be configured the same as or similar to the communication interface 1470 of FIG. 14. The communication module 1520 may include the cellular module 1521, a WiFi module 1523, a Bluetooth (BT) module 1525, a GNSS module 1527, a near field communication (NFC) module 1528, a MST module, and a radio frequency (RF) module 1529. The cellular module 1521 may provide, for example, voice communication, video communication, a character service, an Internet service, or the like over a communication network. According to an embodiment, the cellular module 1521 may perform discrimination and authentication of the electronic device 1501 within a communication network by using the subscriber identification module (e.g., a SIM card) 1529. According to an embodiment, the cellular module 1521 may perform at least a portion of functions that the processor 1510 provides. According to an embodiment, the cellular module 1521 may include a communication processor (CP). According to an embodiment, at least a part (e.g., two or more) of the cellular module 1521, the WiFi module 1523, the BT module 1525, the GNSS module 1527, the NFC module 1528, or the MST module may be included within one Integrated Circuit (IC) or an IC package. For example, the RF module 1529 may transmit and receive a communication signal (e.g., an RF signal). For example, the RF module 1529 may include a transceiver, a power amplifier module (PAM), a frequency filter, a low noise amplifier (LNA), an antenna, or the like. According to another embodiment, at least one of the cellular module 1521, the WiFi module 1523, the BT module 1525, the GNSS module 1527, the NFC module 1528, or the MST module may transmit and receive an RF signal through a separate RF module. The subscriber identification module 1524 may include, for example, a card or embedded SIM that includes a subscriber identification module and may include unique identify information (e.g., integrated circuit card identifier (ICCID)) or subscriber information (e.g., integrated mobile subscriber identity (IMSI)).

The memory 1530 (e.g., the memory 1430) may include an internal memory 1532 or an external memory 1534. For example, the internal memory 1532 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD). The external memory 1534 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1534 may be operatively and/or physically connected to the electronic device 1501 through various interfaces.

The sensor module 1540 may measure, for example, a physical quantity or may detect an operation state of the electronic device 1501. The sensor module 1540 may convert the measured or detected information to an electric signal. For example, the sensor module 1540 may include at least one of a gesture sensor 1540A, a gyro sensor 1540B, a barometric pressure sensor 1540C, a magnetic sensor 1540D, an acceleration sensor 1540E, a grip sensor 1540F, the proximity sensor 1540G, a color sensor 1540H (e.g., red, green, blue (RGB) sensor), a biometric sensor 1540I, a temperature/humidity sensor 1540J, an illuminance sensor 1540K, or an UV sensor 1540M. Although not illustrated, additionally or alternatively, the sensor module 1540 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1540 may further include a control circuit for controlling at least one or more sensors included therein. According to an embodiment, the electronic device 1501 may further include a processor that is a part of the processor 1510 or independent of the processor 1510 and is configured to control the sensor module 1540. The processor may control the sensor module 1540 while the processor 1510 remains at a sleep state.

The input device 1550 may include, for example, a touch panel 1552, a (digital) pen sensor 1554, a key 1556, or an ultrasonic input unit 1558. For example, the touch panel 1552 may use at least one of capacitive, resistive, infrared and ultrasonic detecting methods. Also, the touch panel 1552 may further include a control circuit. The touch panel 1552 may further include a tactile layer to provide a tactile reaction to a user. The (digital) pen sensor 1554 may be, for example, a part of a touch panel or may include an additional sheet for recognition. The key 1556 may include, for example, a physical button, an optical key, a keypad, or the like. The ultrasonic input device 1558 may detect (or sense) an ultrasonic signal, which is generated from an input device, through a microphone (e.g., a microphone 1588) and may check data corresponding to the detected ultrasonic signal.

The display 1560 (e.g., the display 1460) may include a panel 1562, a hologram device 1564, a projector 1566, and/or a control circuit for controlling the panel 1562, the hologram device 1564, or the projector 1566. The panel 1562 may be implemented, for example, to be flexible, transparent or wearable. The panel 1562 and the touch panel 1552 may be integrated into one or more modules. According to an embodiment, the panel 1562 may include a pressure sensor (or force sensor, interchangeably used hereinafter) that measures the intensity of touch pressure by a user. The pressure sensor may be implemented integrally with the touch panel 1552, or may be implemented as at least one sensor separately from the touch panel 1552. The hologram device 1564 may display a stereoscopic image in a space using a light interference phenomenon. The projector 1566 may project light onto a screen so as to display an image. For example, the screen may be arranged in the inside or the outside of the electronic device 1501. The interface 1570 may include, for example, a high-definition multimedia interface (HDMI) 1572, a universal serial bus (USB) 1574, an optical interface 1576, or a D-subminiature (D-sub) 1578. The interface 1570 may be included, for example, in the communication interface 1470 illustrated in FIG. 14. Additionally or alternatively, the interface 1570 may include, for example, a mobile high definition link (MHL) interface, a SD card/multi-media card (MMC) interface, or an infrared data association (IrDA) standard interface.

The audio module 1580 may convert a sound and an electric signal in dual directions. At least a component of the audio module 1580 may be included, for example, in the input/output interface 1450 illustrated in FIG. 14. The audio module 1580 may process, for example, sound information that is input or output through a speaker 1582, a receiver 1584, an earphone 1586, or the microphone 1588. For example, the iris camera module 1591 may shoot a still image or a video. According to an embodiment, the camera module 1591 may include at least one or more image sensors (e.g., a front sensor or a rear sensor), a lens, an image signal processor (ISP), or a flash (e.g., an LED, a xenon lamp, or the like). The power management module 1595 may manage, for example, power of the electronic device 1501. According to an embodiment, a power management integrated circuit (PMIC), a charger IC, or a battery or fuel gauge may be included in the power management module 1595. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1596 and a voltage, current or temperature thereof while the battery is charged. The battery 1596 may include, for example, a rechargeable battery and/or a solar battery.

The indicator 1597 may display a specific state of the electronic device 1501 or a part thereof (e.g., the processor 1510), such as a booting state, a message state, a charging state, and the like. The motor 1598 may convert an electrical signal into a mechanical vibration and may generate the following effects: vibration, haptic, and the like. A processing device (e.g., a GPU) for supporting a mobile TV may be included in the electronic device 1501. The processing device for supporting the mobile TV may process media data according to the standards of digital multimedia broadcasting (DMB), digital video broadcasting (DVB), MediaFlo™, or the like.

Figure 16:
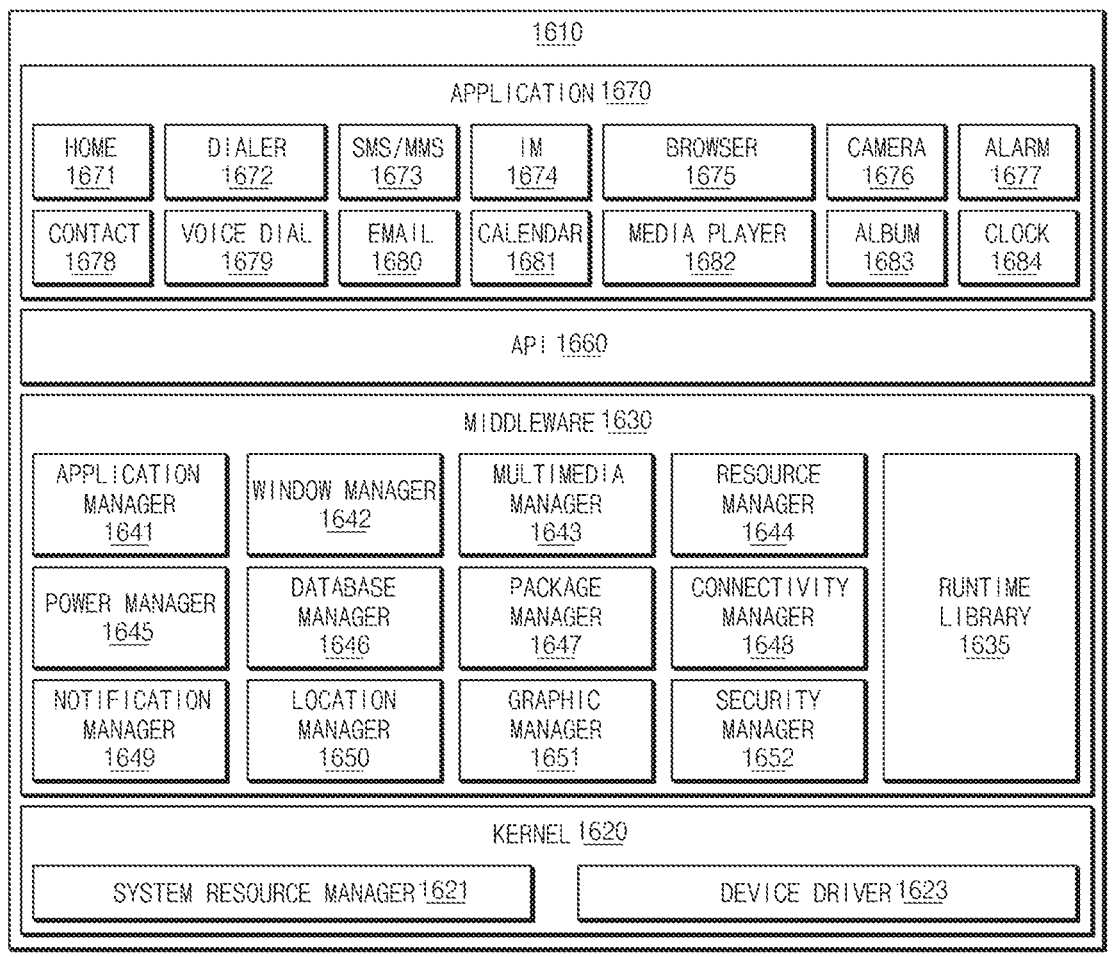
FIG. 16 is a block diagram of a program module, according to various embodiments.

FIG. 16 illustrates a block diagram of a program module, according to various embodiments.

According to an embodiment, a program module 1610 (e.g., the program 1440) may include an operating system (OS) to control resources associated with an electronic device (e.g., the electronic device 1401), and/or diverse applications (e.g., the application program 1447) driven on the OS. The OS may be, for example, Android™, iOS™, Windows™, Symbian™, Tizen™, or Bada™. Referring to FIG. 16, the program module 1610 may include a kernel 1620 (e.g., the kernel 1441), a middleware 1630 (e.g., the middleware 1443), an application programming interface (API) 1660 (e.g., the API 1445), and/or an application 1670 (e.g., the application program 1447). At least a portion of the program module 1610 may be preloaded on an electronic device or may be downloadable from an external electronic device (e.g., the electronic device 1402 or 1404, the server 1406, or the like).

The kernel 1620 may include, for example, a system resource manager 1621 or a device driver 1623. The system resource manager 1621 may perform control, allocation, or retrieval of system resources.

According to an embodiment, the system resource manager 1621 may include a process managing unit, a memory managing unit, or a file system managing unit. The device driver 1623 may include, for example, a display driver, an iris camera driver, a Bluetooth driver, a shared memory driver, a USB driver, a keypad driver, a Wi-Fi driver, an audio driver, or an inter-process communication (IPC) driver. The middleware 1630 may provide, for example, a function that the application 1670 needs in common, or may provide diverse functions to the application 1670 through the API 1660 to allow the application 1670 to efficiently use limited system resources of the electronic device.

According to an embodiment, the middleware 1630 may include at least one of a runtime library 1635, an application manager 1641, a window manager 1642, a multimedia manager 1643, a resource manager 1644, a power manager 1645, a database manager 1646, a package manager 1647, a connectivity manager 1648, a notification manager 1649, a location manager 1650, a graphic manager 1651, a security manager 1652, or a payment manager.

The runtime library 1635 may include, for example, a library module that is used by a compiler to add a new function through a programming language while the application 1670 is being executed. The runtime library 1635 may perform input/output management, memory management, or arithmetic functions. The application manager 1641 may manage, for example, a life cycle of at least one application of the application 1670.

The window manager 1642 may manage a graphic user interface (GUI) resource that is used in a screen. The multimedia manager 1643 may identify a format necessary for playing media files, and may perform encoding or decoding of media files by using a codec suitable for the format. The resource manager 1644 may manage source code of the application 1670 or a memory space. The power manager 1645 may to manage a battery or power, and may provide power information for an operation of an electronic device. According to an embodiment, the power manager 1645 may be interlocked with a basic input/output system (BIOS). For example, the database manager 1646 may generate, search for, or modify database that is to be used in the application 1670. The package manager 1647 may install or update an application that is distributed in the form of package file.

The connectivity manager 1648 may manage, for example, wireless connection. For example, the notification manager 1649 may notify an event such as arrival message, appointment, or proximity notification to a user. The location manager 1650 may manage, for example, location information about an electronic device. The graphic manager 1651 may manage, for example, a graphic effect that is provided to a user, or manage a user interface relevant thereto. The security manager 1652 may provide system security or user authentication.

The middleware 1630 may include a telephony manager for managing a voice or video call function of the electronic device and a middleware module that combines diverse functions of the above-described components. According to an embodiment, the middleware 1630 may provide a module specialized to each OS kind to provide differentiated functions. The middleware 1630 may dynamically remove a part of the preexisting components or may add new components thereto. The API 1660 may be, for example, a set of programming functions and may be provided with a configuration that is variable depending on an OS. For example, in the case where an OS is Android™ or iOS™, it may provide one API set per platform. In the case where an OS is Tizen™ it may provide two or more API sets per platform.

The application 1670 may include, for example, one or more applications capable of providing functions for a home 1671, a dialer 1672, an SMS/MMS 1673, an instant message (IM) 1674, a browser 1675, an iris camera 1676, an alarm 1677, a contact 1678, a voice dial 1679, an e-mail 1680, a calendar 1681, a media player 1682, an album 1683, a watch 1684, and a payment or for offering health care (e.g., measuring an exercise quantity, blood sugar, or the like) or environment information (e.g., information of barometric pressure, humidity, temperature, or the like).

According to an embodiment, the application 1670 may include an application to support information exchange between an electronic device and an external electronic device. The information exchanging application may include, for example, a notification relay application for transmitting specific information to an external electronic device, or a device management application for managing the external electronic device. For example, the notification relay application may transmit notification information, which arise from other application of an electronic device, to an external electronic device or may provide the notification information received from an external electronic device to a user.

The device management application may install, delete, or update, for example, a function (e.g., turn-on/turn-off of an external electronic device itself (or a part) or adjustment of brightness (or resolution) of a display) of the external electronic or an application running in the external electronic device. According to an embodiment, the application 1670 may include an application (e.g., a health care application of a mobile medical device) that is assigned in accordance with an attribute of an external electronic device. According to various embodiments, at least a portion of the program module 1610 may be implemented (e.g., executed) by software, firmware, hardware (e.g., the processor 1410 or 120 or 220), or a combination of two or more thereof and may include modules, programs, routines, sets of instructions, processes, or the like for performing one or more functions.

The term "module" used in the present disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 120, 140, or 1420), may cause the one or more processors to perform a function corresponding to the instruction. The computer-readable storage media, for example, may be the memory 130 or 230.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added. While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
   an electromagnetic induction panel associated with collection of pen data based on an electronic pen input;
   a memory to store at least one correction table configured to correct pen data made at mutually different positions based on parts of the electromagnetic induction panel;
   a processor electrically connected to the electromagnetic induction panel and the memory and configured to correct the pen data through a specified correction table of the at least one correction table based on a connection state or an arrangement state between the electronic device and an accessory including at least a part of a magnet member or a metal member that is able to exert an electrical influence or a magnetic influence on the electromagnetic induction panel; and
   a connector configured to allow connection of the accessory,
   wherein the processor is configured to:
      determine a type of an accessory connected through the connector by a physical device disposed in the connector; and
      select a specified correction table based on the type of the accessory to correct the pen data.

2. The electronic device of claim 1, further comprising:
   at least one hall sensor to collect sensing information for determining the connection state or the arrangement state with the accessory.

3. The electronic device of claim 2, wherein the processor is further configured to:
   determine a type of the accessory based on identification information of the hall sensor; and
   use a correction table, which corresponds to the type of the accessory, to correct the pen data.

4. The electronic device of claim 2, wherein the processor is further configured to:
   determine the arrangement state between the accessory and the electronic device based on identification information of the hall sensor; and
   select a correction table corresponding to the arrangement state to use the correction table to correct the pen data.

5. The electronic device of claim 1, further comprising:
   an arrangement state detection sensor to collect sensing information associated with movement of the electronic device or arrangement state determination of the electronic device.

6. The electronic device of claim 5, wherein the processor is further configured to:
   determine the arrangement state of the electronic device based on the sensing information transmitted from the arrangement state detection sensor in the connection state with the accessory; and
   select a correction table corresponding to the arrangement state of the electronic device to use the correction table to correct the pen data.

7. The electronic device of claim 1, further comprising:
   a pen processor to process transmission and reception of a signal of the electromagnetic induction panel.

8. The electronic device of claim 7, wherein the processor is further configured to:
   process correcting of the pen data by transmitting the selected correction table to the pen processor.

9. An electronic device comprising:
   a housing;
   an electromagnetic induction panel provided inside the housing and associated with collection of pen data based on an electronic pen input;
   a memory to store at least one correction table configured to correct pen data made at mutually different positions based on parts of the electromagnetic induction panel;
   a hall sensor provided at one side of the housing and creating hall sensing information generated from approach of a cover including at least a portion of a magnet member or a metal member that is able to exert an electrical influence or a magnetic influence on the electromagnetic induction panel; and
   a processor configured to select a specified correction table of the at least one correction table based on the hall sensing information received from the hall sensor such that the specified correction table is applied to correct the pen data.

10. The electronic device of claim 9, wherein the processor is further configured to:
    determine a type of the cover based on the hall sensing information and select a specified correction table based on the type of the cover such that the specified correction table is applied to correct the pen data; and
    determine a mounting state of the electronic device to the cover based on the hall sensing information and select a specified correction table based on the mounting state such that the specified correction table is applied to correct the pen data.

11. The electronic device of claim 9, further comprising:
    a display to output information associated with whether the cover is connected or whether the correction table is changed.

12. A method for processing a pen input, the method comprising:
    receiving a pen input;
    determining whether hall sensing information is received, from at least one hall sensor;
    selecting any one correction table of at least one correction table configured to correct pen data at mutually different positions based on parts of an electromagnetic induction panel corresponding to that the hall sensing information is received; and correcting pen data, which corresponds to the received pen input, based on the selected correction table, wherein selecting any one correction table includes:
- determining a type of an accessory based on the hall sensing information and selecting a correction table corresponding to the type of the accessory;
- determining an arrangement state between the accessory and an electronic device based on identification information of the hall sensor and selecting a correction table corresponding to the arrangement state;
- determining the arrangement state of the electronic device based on sensing information associated with movement of the electronic device or arrangement state determination of the electronic device and selecting a correction table corresponding to the arrangement state of the electronic device;
- determining a type of a cover including at least a part of a magnet member or a metal member that affects detection of the pen input based on the hall sensing information and selecting a specified correction table based on the type of the cover; and
- determining a mounting state of the electronic device to the cover including at least a part of the magnet member or the metal member that affects the detection of the pen input based on the hall sensing information and selecting a specified correction table based on the mounting state.

13. The method of claim 12, further comprising:
outputting information associated with whether the cover is connected or the correction table is changed.

* * * * *